US007026944B2

(12) United States Patent
Alioto et al.

(10) Patent No.: US 7,026,944 B2
(45) Date of Patent: Apr. 11, 2006

(54) APPARATUS AND METHOD FOR DETECTING RADIATION OR RADIATION SHIELDING IN CONTAINERS

(75) Inventors: John I. Alioto, San Francisco, CA (US); Kenneth L. Greer, Los Altos Hills, CA (US); Matthew T. Alioto, Los Angeles, CA (US)

(73) Assignee: Veritainer Corporation, St. Helena, CA (US)

( * ) Notice: Subject to any disclaimer, the term of this patent is extended or adjusted under 35 U.S.C. 154(b) by 142 days.

(21) Appl. No.: 10/600,307

(22) Filed: Jun. 19, 2003

(65) Prior Publication Data

US 2006/0007006 A1   Jan. 12, 2006

Related U.S. Application Data

(63) Continuation-in-part of application No. 10/356,154, filed on Jan. 31, 2003, now Pat. No. 6,768,421.

(51) Int. Cl.
*G08B 17/12* (2006.01)
(52) U.S. Cl. ................... 340/600; 340/603; 378/57; 378/62
(58) Field of Classification Search ............. 340/600, 340/603, 854.1, 854.6, 856.3; 378/57, 62, 378/88; 250/363.01, 363.02, 362, 390.04, 250/394, 395
See application file for complete search history.

(56) References Cited

U.S. PATENT DOCUMENTS

| 5,416,330 | A | * | 5/1995 | Abul-Faraj et al. ......... 250/395 |
| 5,479,023 | A | * | 12/1995 | Bartle .................. 250/390.04 |
| 5,692,029 | A | * | 11/1997 | Husseiny et al. ............ 378/88 |
| 5,838,759 | A | * | 11/1998 | Armistead .................. 378/57 |
| 6,389,305 | B1 | | 5/2002 | Deban |
| 6,395,480 | B1 | | 5/2002 | Hefti |
| 6,768,421 | B1 | * | 7/2004 | Alioto et al. ............... 340/600 |
| 6,791,093 | B1 | * | 9/2004 | Caldwell et al. ........... 250/395 |

OTHER PUBLICATIONS

Siegel. "U.S. Response I: Customs Seeks to Reverse Shipping Inspection Procedures." Global Security Newswire. Jan. 18, 2002.

(Continued)

*Primary Examiner*—Van T. Trieu
(74) *Attorney, Agent, or Firm*—Anthony T. Cascio

(57) ABSTRACT

A computer program, database and method for the detection of fissile or radioactive material or radiation shielding material in a container works with detection devices brought into proximity to containers so that the presence of fissile or radioactive material, or shielding materials to conceal the presence of such fissile or radioactive materials, may be detected. A comparison may then be made of the output of the detector to a threshold to determine subsequent action regarding the shipping container. The threshold may be based on the output of known, dangerous radioactive materials, known legitimate contents or empty containers.

153 Claims, 9 Drawing Sheets

OTHER PUBLICATIONS

Robinson, "Improving Homeland Security." Advanced Technology Development Center. Oct. 25, 2002.

Technical Associates, "Radiation scanner for caargo containers & trucks." www.tech-associates.com.

Krotz, "Homeland Security Gets High-Tech Help," Berkeley Lab Research Review. Mar. 2002.

Aspect Scien. Prod. Cntr, "Handheld scintillation gamma spectrometer"aspect.dubn.

Shapiro, "Terminals install radiation-detection equipment," The Virginian-Pilor Dec. 21, 2003.

SAIC, www.saic.com.

Powers, "Container scanners, " Digital Ship, Nov. 2, p. 30.

Radiation Detection Center, "Technology Fact Sheet," Lawrence LIvermore National Laboratory.

Snell, "Gamma-Ray Technology, " Port Technology International.

Tirschwell, "Watching for nukes," The Journal of Commerce. Jan. 13-19,2003.

Radcomm Systes, "Radiation Detection System." Feb. 5, 2003.

SAIC, "Inspection technologies," web-site: http://www.saic.com.

Richardson, et al., "New Cargo Inspection and Transportation Technology Application." Port Tech International.

Saint-Gobain Crystals & Detectors, web site: http://www.bicron.com.

Scientific Text Book, "Attenuation of Radiation in Matter."

(Author Unknown), PPPL Researchers Develop Anti-terrorism Device, PPPL Digest, Apr. 2003, pp. 1-4.

Mammone, Richard et al., Warning and Indicator Systems, WISE LAB, Rutgers University, Power Point presentation downloaded from http://www.caip.rutgers.edu/wiselab, pp.s 1-15.

Wilder, Joseph, Radiation Bomb Detection Through Signal Analysis and Pattern Recognition, Rutgers University Center for Advanced Information Processing, PDF document downloaded from http://www.caip.rutgers.edu/wiselab, pp. 1-16.

* cited by examiner

CREATE ORIGINAL BACKGROUND FINGERPRINT

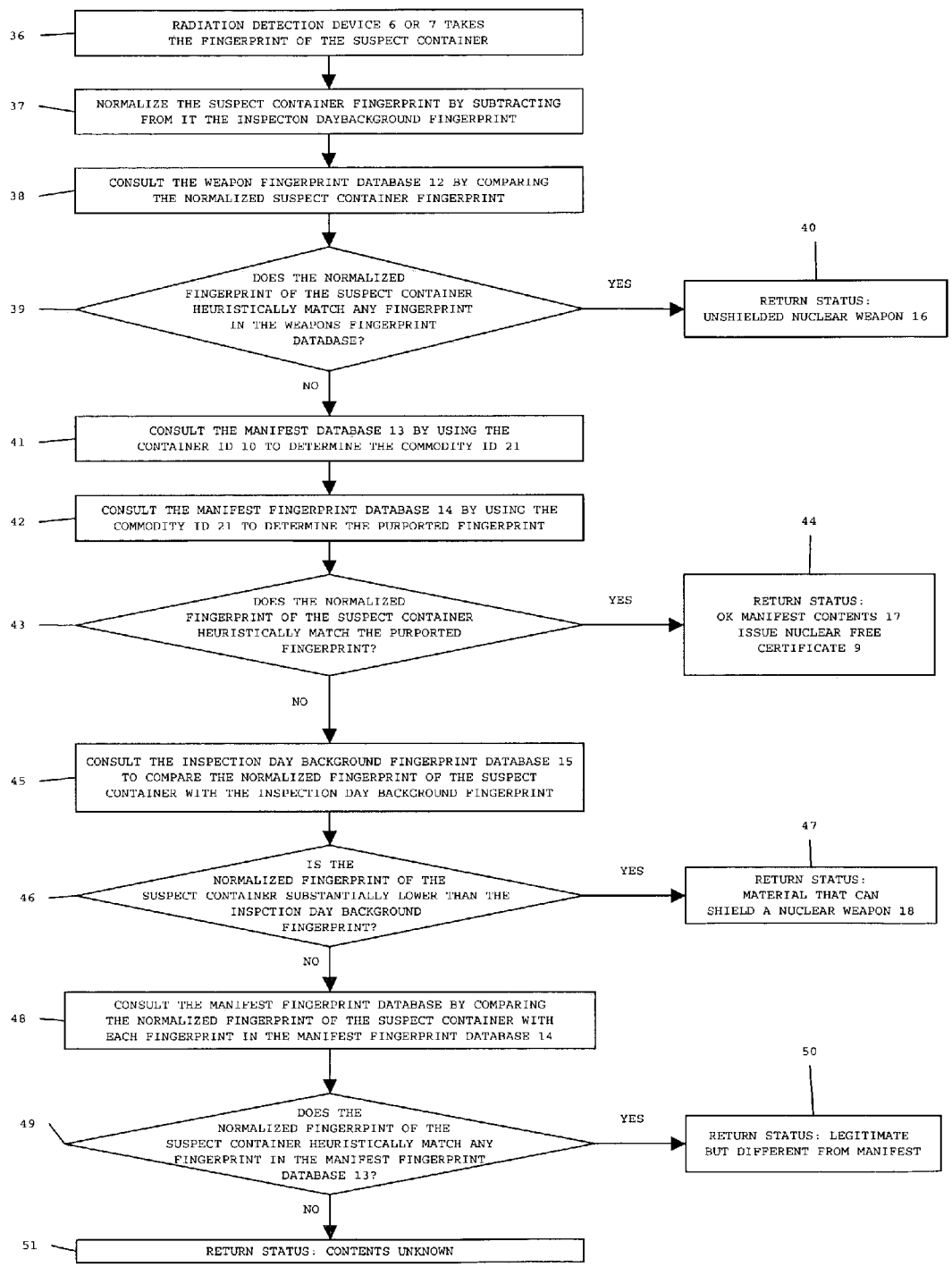

APPARATUS AND METHOD FOR DETECTING RADIATION OR RADIATION SHIELDING IN CONTAINERS

RELATED APPLICATION DATA

The present application is a continuation-in-part of the commonly owned, application for patent having at least one inventor in common herewith and entitled "Container Crane Radiation Detection Systems and Methods," Ser. No. 10/356,154, filed Jan. 31, 2003 now U.S. Pat. No. 6,768,421, the specification of which is incorporated herein by reference.

BACKGROUND OF THE INVENTION

1. Field of the Invention

The present invention is directed to a method for the detection of fissile or radioactive material or radiation shielding material. More particularly, it is directed to a method to detect the presence of radioactive or radiation shielding materials in a shipping container where the contents of the container are listed on a manifest, packing slip or other list of contents.

2. Background of the Art

On Sep. 11, 2001, the United States was attacked by a terrorist network named al Qaeda. The al Qaeda terrorists hijacked four commercial airliners to launch a massive attack. The terrorists flew a hijacked airliner into each of the two towers of the World Trade Center in New York City and one into the Pentagon in Washington, D.C., the military headquarters of our country. The efforts of courageous airline passengers and crew foiled the attempt to fly the fourth hijacked airliner into an additional target, most likely in the Washington, D.C. area, by causing it to crash into the Pennsylvania countryside. In all, over 3,000 people were killed on American soil on the morning of Sep. 11, 2001.

The September 11 attacks were a wake-up call for America. Americans suddenly realized that our free and open society was vulnerable to terrorist attack in many ways. Everywhere, Americans saw vulnerabilities, especially to "weapons of mass destruction" such as nuclear weapons. One type of nuclear weapon is a device, such as a bomb or warhead, whose great explosive power derives from the release of nuclear energy.

Another type of nuclear weapons includes the so-called "dirty bomb." A dirty bomb is a conventional explosive device packed with radioactive material to spread radioactive contamination that causes sickness in human beings. Radiation sickness is illness induced by exposure to ionizing radiation, ranging in severity from nausea, vomiting, headache, and diarrhea to loss of hair and teeth, reduction in red and white blood cell counts, extensive hemorrhaging, sterility and death.

Vulnerability of harm to the populace caused by terrorists from nuclear weapons requires that such weapons be delivered to and detonated in the target area. However, a terrorist relies on stealth in which to deliver a weapon and not conventional military means of delivery. For example, a terrorist may be able to stealthily deliver a nuclear weapon onto American soil by secreting it in one of the tens of thousands of shipping containers that are brought into the United States every day.

One of the purposes of this invention, when used together with radiation detection and radiation shielding detection devices, is to prevent the transportation of nuclear weapons by stealth in shipping containers into and out of ports anywhere in the world, in general, and into and out of ports in the United States, in particular. A further purpose of this invention, when used together with radiation detection and radiation shielding detection devices, is to prevent nuclear weapons from being imported into the United States by stealth in shipping containers that are (1) loaded in foreign ports; (2) transported to the United States by ships, including huge ocean-going containerships that carry upwards of 4,000 twenty-foot-equivalent units ("TEUs") shipping containers; and, (3) unloaded in, or brought into close proximity to, ports or population centers in the United States. Using this invention together with radiation detection and radiation shielding detection devices, the threat from terrorists attacking the United States or any other nation with nuclear weapons brought into proximity to population centers by stealth in a shipping container can be mitigated.

a. Detection Systems

It is known in the art of nuclear weapon detection technology that uranium based nuclear weapons emit detectable gamma rays. Given the periodic table symbol "U," uranium is a heavy silvery-white metallic element, radioactive and toxic, easily oxidized, and having 14 known isotopes of which U 238 is the most abundant in nature. The element occurs in several minerals, including uraninite and carnotite, from which it is extracted and processed for use. It has an atomic number 92; atomic weight 238.03; melting point 1,132° C.; boiling point 3,818° C.; specific gravity 18.95; valence 2, 3, 4, 5, 6. Uranium is enriched in a process whereby the amount of one or more radioactive isotopes in the material is increased.

It is also known in the art of nuclear weapon detection technology that plutonium based nuclear weapons emit detectable gamma rays. Given the periodic table symbol "Pu," plutonium is a naturally radioactive, silvery, metallic transuranic element, occurring in uranium ores and produced artificially by neutron bombardment of uranium. Its longest-lived isotope is Pu 244 with a half-life of 76 million years. It is a radiological poison, specifically absorbed by bone marrow, and is used, especially the highly fissionable isotope Pu 239, as a reactor fuel and in nuclear weapons. It has an atomic number 94; melting point 640° C.; boiling point 3,235° C.; specific gravity 19.84; valence 3, 4, 5, 6.

Since the 1911 work of Hans Geiger, it has been know that devices can detect the presence of ionizing radiation. Named the Geiger-Müller counter, an improved version of the device detects alpha particles, electrons and ionizing electromagnetic photons. Modernly, plastic scintillation is used to detect gamma radiation. For example, Canberra Industries, Inc. of Meriden, Conn. (www.canberra.com) manufactures and markets monitors that use scintillation detectors designed for the radiological control of pedestrian vehicles, trucks and rail cars. For another example, Amptek, Inc. of Bedford, Mass. (www.amptek.com) manufactures and markets a "Gamma-8000" scintillation detector that utilizes sodium iodide crystal detection and digitalization to detect and spectrographically analyze gamma radiation. There are other devices commercially available that can be used to detect radiation, including those that use both scintillating and non-scintillating materials (solid state detectors such as mercuric iodide or cadmium telluride). In this description and the appended claims, all of these devices are generically referred to as "'fissile or ' radioactive material detection device(s)."

It is known in the art of nuclear weapon detection technology that the presence of uranium or plutonium based nuclear weapons can be concealed by covering the weapon with radiation shielding material such as lead. Given the periodic table symbol "Pb," lead is a soft, malleable, ductile, bluish-white, dense metallic element, extracted chiefly from galena and used in containers and pipes for corrosives, solder and type metal, bullets, radiation shielding, paints, and antiknock compounds. It has an atomic number 82; atomic weight 207.2; melting point 327.5° C.; boiling point 1,744° C.; specific gravity 11.35; valence 2, 4. A nuclear weapon could be placed in a shipping container and then covered with a layer of radiation shielding material, typically lead of one to two inches or more in thickness. In this way, the fissile or radioactive material detection device or devices may not be capable of identifying the presence of the nuclear weapon. Thus, radiation shielding material can be used to deliver and detonate a nuclear weapon on American soil by bringing the weapon into the country by stealth in a shipping container.

Other shielding materials are also known in the art. For example, high density concrete is typically used to contain radioactive emission in structures. The thickness of high density concrete to shield a nuclear weapon placed in a shipping container could be in the same order of magnitude as the thickness of lead required in the above example. All of these shielding materials will attenuate or entirely block gamma radiation such that the presence of fissile or radioactive material cannot be detected.

There are two major limitations on the use by terrorists of radiation shielding material to shield the radiation emanating from a nuclear device hidden in a shipping container: (1) an x-ray or other similar detection system can detect the presence of an amount of radiation shielding material necessary to shield the radiation emanating from the nuclear device; and, (2) the maximum amount of weight of the shipping container permitted by various state and federal regulations in the United States in order that the container be truly intermodal (the so-called "over-the-road" weight limitation). In either event, as more fully discussed below, the presence of the concealed weapon has been indirectly made known through the presence of the shielding material, thereby thwarting the terrorist attack.

First, x-ray or other similar detection inspection systems of shipping containers to attempt to discern the presence of radiation shielding material are well known in the art. For example, some of these inspection systems typically produce a transmission image by the measurement of the intensity distribution of the x-rays that transverse the shipping container. X-ray or other such detection systems rely on a source that emits x-rays, gamma rays or other radiation. These are sometimes referred to as "active" systems in the sense that they generate radiation to be passed through an object to be scanned, and then measure the intensity, location or other attribute of the radiation exiting such object. Thus, radiation shielding material used to cover a nuclear weapon can be detected by the use of such x-ray or other active detection systems, since such material would be absorptive of the radiation.

However, the use of active detection systems to detect radiation shielding suffers from serious drawbacks. Active detection systems (1) produce harmful radiation and thus are not suitable for the work environment; (2) can damage certain types of cargo carried in containers such as photographic film; (3) require a separation space between the radiation source and the detector into which space the inspected container must be placed; and, (4) are difficult to accommodate on the hoist attachment of the container crane.

The present invention permits the effective use of a passive system of detection. It is used together with radiation detection devices that merely record the presence of gamma rays. The system is passive in the sense that it only relies on the spontaneous radiation emitted by fissile or radioactive material, a radiation detector, a computer, a list of the contents said to be in the container (the "manifest") and software product. In this description and the appended claims, all of these systems and devices, active and passive, will be referred to as "radiation shielding detection device(s)."

b. Shipping Container Systems Or Containerization

Since the late 1960's, the use of shipping containers for ocean-going transportation or containerization has been prevalent. The shipping container has significant advantages over the old, so-called "break bulk" system of lashing and shoring of cargo in the cargo holds of "tween deck" vessels or any other type of break bulk system, e.g., LASH barges. Containerization makes intermodal transportation a reality. Once cargo is loaded into a container at its origin (usually by its manufacturer or seller), containerization makes possible the transportation of the container by truck, rail and ship, over land and sea, to its destination without disturbing its contents. Containerization creates greater speed of transportation while, at the same time, less expensive handling, damage and theft.

As with all ocean going freight systems, in containerization, the port or ports of loading and unloading (embarkation and disembarkation) constitute major bottlenecks. At the load port, the full container is taken into the container yard. There, the container's identification (the "Container ID") is recorded for many purposes, including tracking and location purposes. The Container ID can be alphanumeric, numeric, a bar code or other identification designation. At or before this time, the contents in the container are recorded for inclusion on a list or manifest. The manifest lists each container and the contents of each container with specificity (the "ship's manifest"). Transportation companies often create databases that contain the manifest information associated with each container (a "manifest database"). Among other things, the manifest database contains a commodity identification designed to represent the contents in each container (the "Commodity ID"). Commodity IDs have been standardized by the U.S. International Trade Commission (the "standardized Commodity ID") and are sometimes referred to as "harmonized tariff code numbers" or "HTC numbers." (See, Harmonized Tariff Schedule at http://dataweb.usitc.gov/SCRIPTS/tariff/toc.html).

At the load port, the full container is stored, usually in an open yard, to await loading aboard the containership. During this period of storage, the full container can be inspected. However, inspection in the container yard requires that an additional step or function take place, namely, additional handling by additional personnel.

Similarly, at the load port, the partially loaded container is taken into the container yard. There, the Container ID is recorded for many purposes, including tracking and location purposes. Prior to storage in the container yard, the cargo in the partially loaded container may be consolidated with other cargo either in the same container or in another container. At or before this time, the container and its contents are listed on the manifest and in the manifest database. Thereafter, the container is stored in the container yard to await loading aboard the containership. During this period of storage, the container can be inspected. However, once again, inspection in the container yard requires that an additional step or function take place, namely, additional handling by additional personnel.

Tens of thousands of containers are loaded and unloaded in the ports of the world every day. However, only a very small percentage of these containers is inspected. For example, anecdotal evidence suggests that of the some 21,000 containers unloaded in the ports of the United States every day, less than 3% are inspected. This situation represents a major vulnerability to terrorism and other unlawful conduct due to the possibility of concealment of nuclear weapons. Accordingly, a need exists in the art to mitigate the possibility of an attack on the United States, or any other nation or population, with nuclear weapons brought into proximity to population centers by stealth in a shipping container.

SUMMARY OF THE INVENTION

According to the broadest aspects of the present invention, radiation or fissile material or radiation shielding material may be detected in shipping containers by reading digitized gamma ray data passively derived from gamma ray emissions from the container, analyzing the data to determine if the digitized gamma ray data is (a) commensurate with a predetermined gamma ray fingerprint or (b) anomalous to an expected gamma ray fingerprint, and signaling that the container contains radiation or fissile material or radiation shielding material in the event the data is commensurate with the predetermined fingerprint or anomalous to the expected fingerprint.

In other embodiments of the present invention, gamma ray data is gathered and digitized into (1) the intensity of the source of the gamma rays; and/or, (2) the energy of each gamma ray. This gathered and digitized gamma ray data will hereinafter be referred to as a "fingerprint." A fingerprint can be represented as a spectrogram or spectrograph. Weapon fingerprints are fingerprints taken from test containers with fissile or radioactive materials in them (the "weapon fingerprints"). Manifest fingerprints are fingerprints taken from test containers with legitimate contents in them such as those contents listed on the manifest (the "manifest fingerprints"). Background fingerprints are fingerprints taken from empty test containers. Two types of background fingerprints are used in the present invention: (1) the original background fingerprint; and, (2) the inspection day background fingerprint. The original background fingerprint is the fingerprint taken at the time the weapon and manifest databases are created. The inspection day background fingerprint is the fingerprint created on the day that a container is inspected according the present invention as more fully set forth below.

A feature in one particular embodiment of the present invention is that databases of fingerprints are constructed. The databases constructed for use in the present invention are: (1) the weapon fingerprint database; (2) the manifest fingerprint database; and, (3) the inspection day background fingerprint database. In addition, the use of the present invention contemplates access to a manifest database maintained by the company that transports the container and its contents. This manifest database is presently required to be supplied to the U.S. Customs at least 24 hours before containers are loaded on ships bound for the United States. The U.S. Customs requires that the manifest database list each container by Container ID and the contents thereof by standardized Commodity ID or HTC number.

Using the computer program, databases and methods of the present invention, the fingerprint of a given container (the "suspect container") and its associated Container ID are used to analyze the contents by up to four tests: (1) the weapon test; (2) the manifest test; (3) the background radiation test; and, (4) the equivalence radiation test.

1. The Weapon Test:

The weapon fingerprint database is consulted for a heuristic match by comparing the fingerprint of the suspect container with the weapon fingerprints in the weapon fingerprint database. If fingerprint of the suspect container heuristically matches a fingerprint in the weapon fingerprint database, then the suspect container likely contains an unshielded nuclear weapon and a status to that effect is returned if the fingerprint of the suspect container does not heuristically match any fingerprint in the weapon fingerprint database, then the manifest test is performed.

2. The Manifest Test:

The manifest database lists containers by Container ID. It also lists the contents of each such container, each such content being represented by the standardized Commodity ID. The manifest fingerprint database contains fingerprints of legitimate container contents, each such content being identified by the same standardized Commodity ID used by the manifest database. Using the Container ID, the manifest database is queried to determine the standardized Commodity ID of the contents said to be in the suspect container. Using the resulting standardized Commodity ID, the manifest fingerprint database is queried to determine the fingerprint of the contents said to be in the suspect container (the "purported fingerprint").

The manifest fingerprint database is consulted to compare the fingerprint of the suspect container with the purported fingerprint in the manifest fingerprint database. If the fingerprint of the suspect container heuristically matches the purported fingerprint, then the suspect container likely has the contents said to be in it by the manifest and a status to that effect is returned. If the fingerprint of the suspect container does not heuristically match the purported fingerprint, then the background radiation test is performed.

3. The Background Radiation Test:

The inspection day background fingerprint database is consulted to compare the fingerprint of the suspect container with the inspection day background fingerprint in the inspection day background fingerprint database. If the fingerprint of the suspect container is substantially lower than the inspection day background fingerprint, then the suspect container likely contains radiation shielding material that could possibly shield a nuclear weapon and a status to that effect is returned. If the fingerprint of the suspect container is not substantially lower than the inspection day background fingerprint, then the equivalence radiation test is performed.

4. The Equivalence Radiation Test:

If the fingerprint of the suspect container does not heuristically match the purported fingerprint and is not substantially lower than the inspection day background fingerprint; then, the equivalence radiation test is performed. Using the fingerprint of the suspect container, the entire manifest fingerprint database is consulted. If the fingerprint of the suspect container heuristically matches any fingerprint in the manifest fingerprint database, then the suspect container likely contains legitimate contents that are different than those listed on the manifest and a status to that effect is returned. If the fingerprint of the suspect container does not heuristically match any fingerprint in the manifest fingerprint database, then the contents of the suspect container are unknown and a status to that effect is returned.

The following procedures can be used to create these fingerprint databases:

(1) Original Background Fingerprint: An original background fingerprint is created. The original background fingerprint is created by using radioactive or fissile material detection devices to gather data from the contents of a test container with nothing in it. In the preferred embodiment, this data from the contents of a test container with nothing in it is then digitized into both the intensity of the source of gamma rays and the energy of each gamma ray detected. Alternatively, this data may be digitized into either the intensity of the source of gamma rays or the energy of each gamma ray detected. The resulting digitized data constitutes the "original background fingerprint."

(2) Weapon Fingerprint Database. A weapon fingerprint database is created. The weapon fingerprint database is created by using radioactive or fissile material detection devices to gather data from the contents of a series of test containers. Each such test container contains a sample of a known, dangerous radioactive material such as U 238 or Pu 244. These contents may also include combinations of known, dangerous radioactive or fissile materials. In the preferred embodiment, this data from the contents of a series of test containers with known, dangerous radioactive material in them is then digitized into both the intensity of the source of gamma rays and the energy of each gamma ray detected. Alternatively, this data may be digitized into either the intensity of the source of gamma rays or the energy of each gamma ray detected. The resulting digitized data from each such test container constitutes an un-normalized weapon fingerprint (the "un-normalized weapon fingerprint"). Each of the un-normalized weapon fingerprints is then normalized by subtracting the original background fingerprint from it. The result is a database that contains the weapon fingerprint of each known, dangerous radioactive or fissile material. There may be other ways to create the weapon fingerprint database. The intensity of the source and the energy of each gamma ray emitted by a given radioactive or fissile material may be readily available from public sources such as the Nuclear Regulatory Commission.

(3) Manifest Fingerprint Database. A manifest fingerprint database is created. The manifest fingerprint database is created by using radioactive or fissile material detection devices to gather data from the contents of a series of test containers. The so-called "test" containers will necessarily be those that are actually in commerce though the data may be gathered under other circumstances. Each such test container contains known, legitimate contents such as those listed on the ship's manifest or other list of contents. The various types of legitimate contents are those permitted to be carried in a container by shipping authorities such as, for example, contents listed on the U.S. International Trade Commission's Harmonized Tariff Schedule. (http://dataweb.usitc.gov/SCRIPTS/tariff/toc.html). In the preferred embodiment, this data from the contents of a series of test containers with known, legitimate contents in them is then digitized into both the intensity of the source of gamma rays and the energy of each gamma ray detected. Alternatively, this data may be digitized into either the intensity of the source of gamma rays or the energy of each gamma ray detected. The resulting digitized data from each test container constitutes an un-normalized manifest fingerprint (the "un-normalized manifest fingerprint"). Each of the un-normalized manifest fingerprints is then normalized by subtracting the original background fingerprint from it. The result is a database that contains the manifest fingerprint of each known, legitimate container content, such content being identified by the same standardized Commodity ID used to represent that content in the manifest database.

It should be noted that the various types of legitimate contents sometimes will (1) not emit any gamma rays and the resulting digitized data will only be background radiation; and/or, (2) only attenuate (decrease the intensity/energy of gamma rays as they pass through matter) the background radiation and the resulting digitized data will be less than background radiation. The manifest fingerprint of each known, legitimate container content may thus be a negative value or simply measured by its difference from the original background fingerprint. It should also be noted that there is a formula for the attenuation of gamma rays in matter. The formula will permit anticipation of the manifest fingerprint where the following information is known: (1) the thickness and consistency of the of the container wall; (2) the thickness and consistency of the container contents; and, (3) the intensity and energy of the gamma radiation being attenuated. The thickness and consistency of a shipping container is standardized. The ship's manifest should contain information as to the thickness and consistency of the cargo content of the shipping container. And the intensity of the radiation being attenuated is known because the inspection day background fingerprint is used in the present invention as set forth immediately below.

(4) Inspection Day Background Fingerprint Database: An inspection day background fingerprint database is created. An inspection day background fingerprint is created by using radioactive or fissile material detection devices to gather data from an empty container on the day suspect containers will be inspected. In the preferred embodiment, this data from an empty container gathered on the day suspect containers will be inspected is then digitized into both the intensity of the source of gamma rays and the energy of each gamma ray detected. Alternatively, this data may be digitized into either the intensity of the source of gamma rays or the energy of each gamma ray detected. Preferably, the inspection day background fingerprint should be recorded when the hoist attachment of the container crane is at its highest elevation from the top wharfage. In this way, a more accurate inspection day background fingerprint is achieved. The resulting digitized data constitutes the inspection day background fingerprint which is then stored in the inspection day background fingerprint database.

BRIEF DESCRIPTION OF THE DRAWINGS

FIG. 9 is a flow chart which illustrates one embodiment of the computer program, database structures and methods of the present invention.

DESCRIPTION OF THE EXEMPLARY PREFERRED EMBODIMENT

Figure 1:
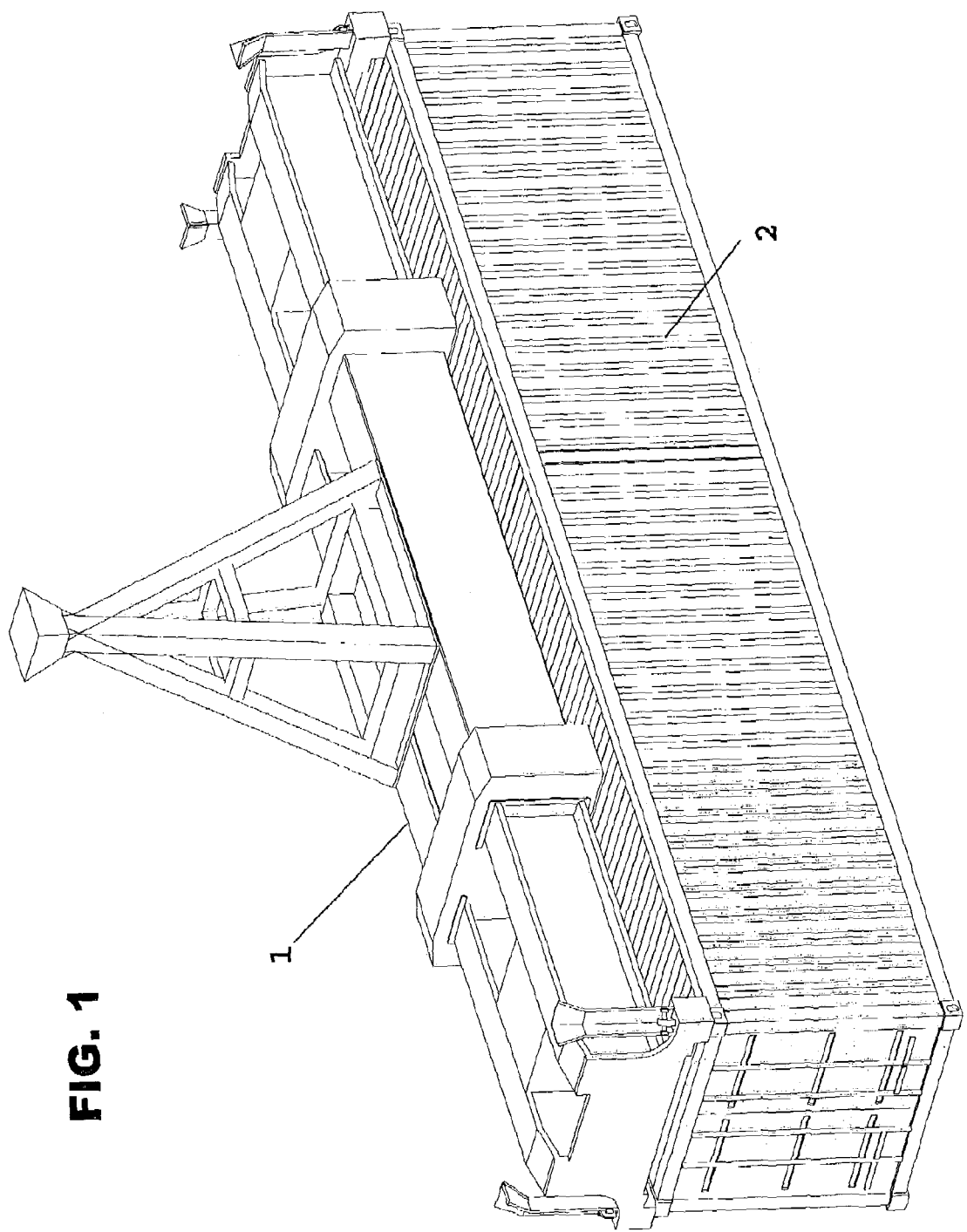
FIG. 1 is a perspective view of a shipping container engaged by a hoist attachment of a container crane.

FIG. 1 shows a hoist attachment 1 when it is attached to the container 2.

Figure 2:
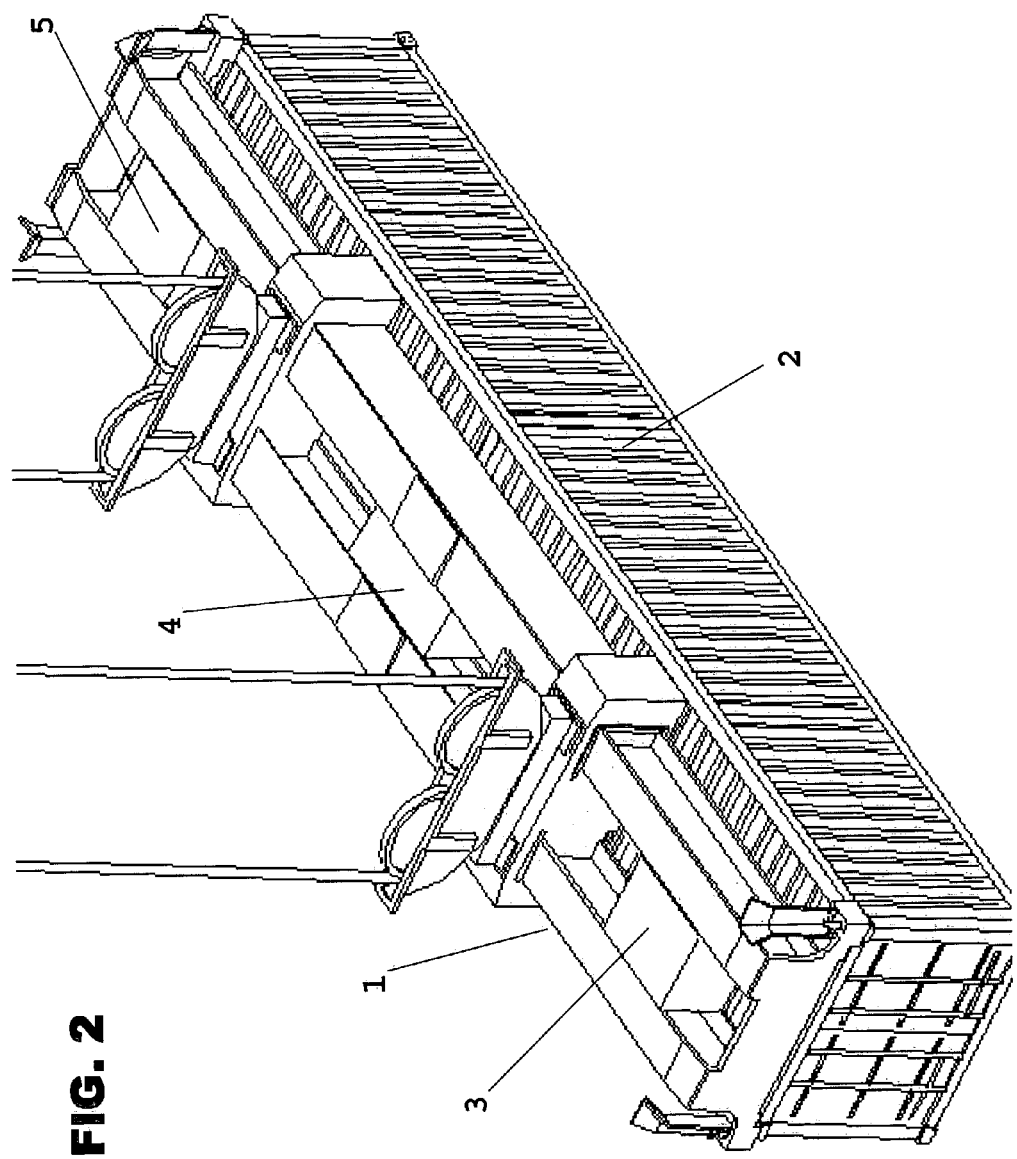
FIG. 2 is a perspective view of a shipping container engaged by a hoist attachment of a container crane with three radiation or fissile material detection devices placed in three housings located between the spreader bars of the hoist attachment.

FIG. 2 is another perspective of the hoist attachment 1 when it is attached to the container 2. From this perspective, the housings 3, 4 and 5 for the fissile or radioactive material detection devices 6, radiation shielding detection devices 7 and computers or PCs 8 can be seen. It should be understood that the fissile or radioactive material detection device 6 and radiation shielding detection device 7 can be the same device working in concert with the computer or PC 8 and the computer program, database structures and methods of the present invention to detect both fissile or radioactive material and radiation shielding material.

Figure 3:
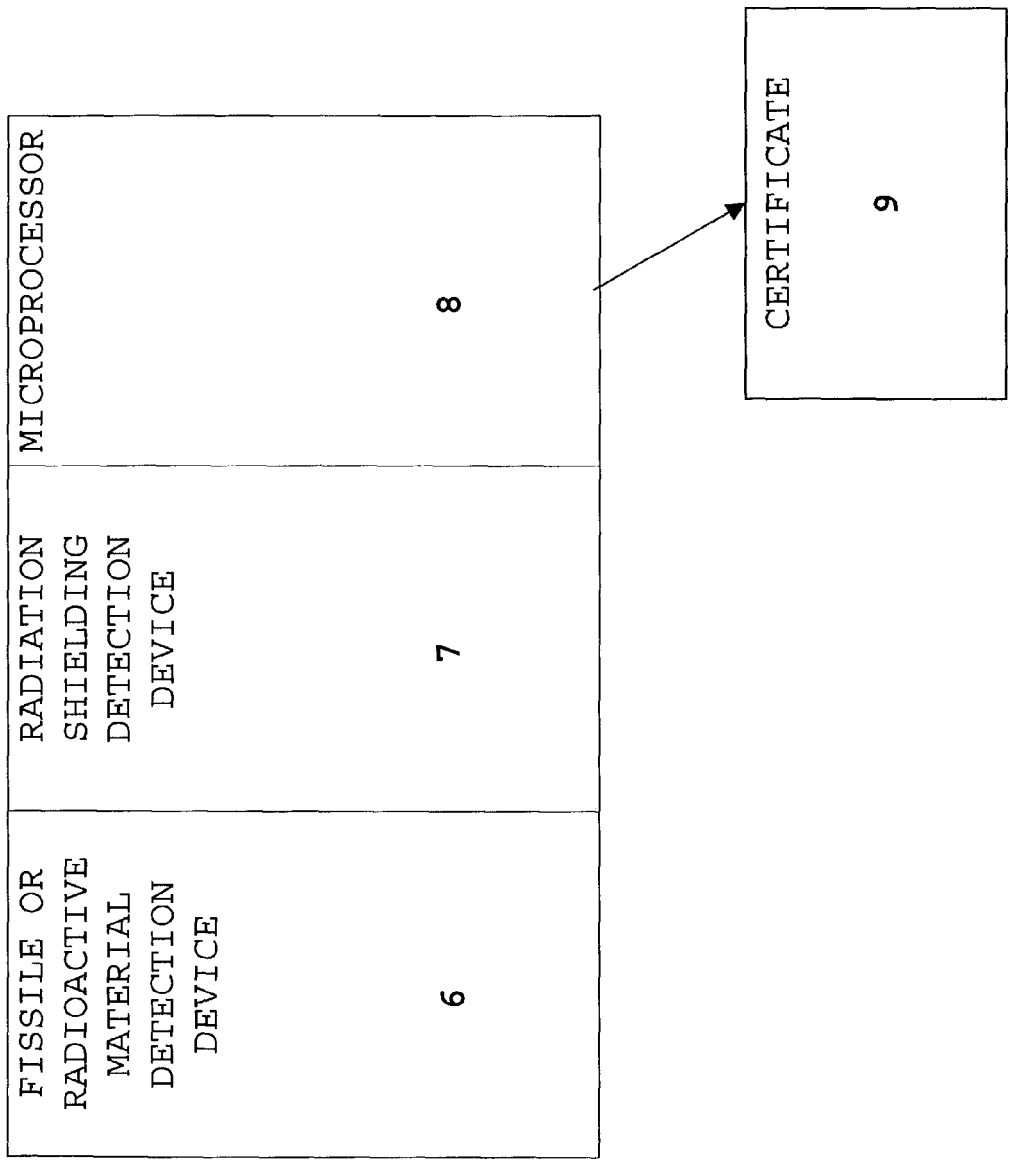
FIG. 3 is a diagram of the fissile or radioactive material detection device, radiation shielding detection device and computer located in housing on the container crane, preferably on the hoist attachment.

FIG. 3 is a diagram of the contents of one of the housings 3, 4 or 5 located on the hoist attachment 1 showing a fissile or radioactive material detection device 6, radiation shielding detection device 7 and computer or PC 8. The fissile or radioactive material detection device 6 and radiation shielding detection device 7 may be housed in one or more housings located on the container crane 2, preferably on the hoist attachment 1. The computer or PC 8 need not be housed on the container crane. It should be understood that the fissile or radioactive material detection device 6 and radiation shielding detection device 7 can be the same device working in concert with the computer or PC 8 and the computer program, database structures and methods of the present invention to detect both fissile or radioactive material and radiation shielding material.

Figure 4:
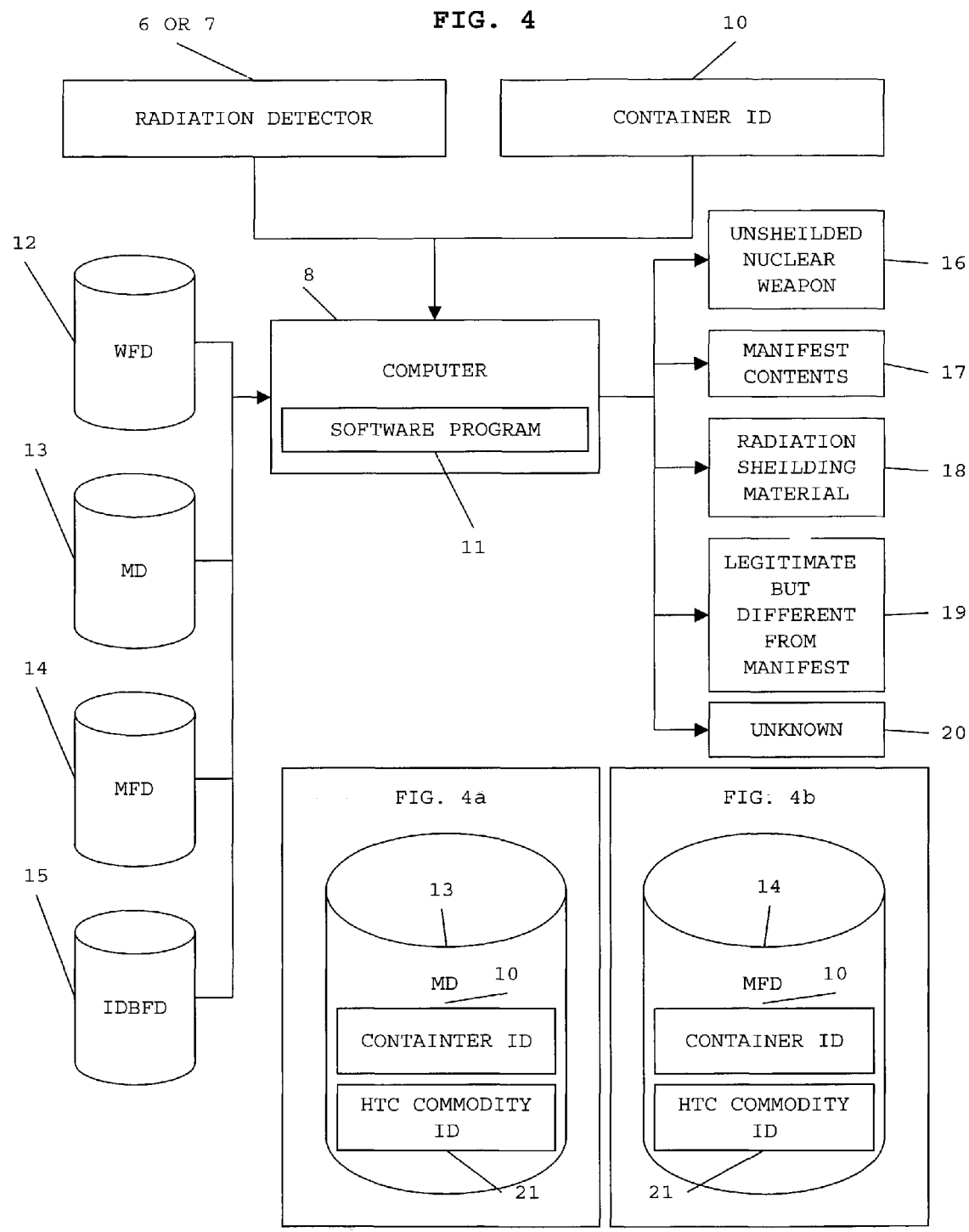
FIG. 4 is a diagram of the input, components and output of the present invention.

FIG. 4 is a diagram of the components used in the computer program, database structures and methods of the present invention. There are six sources of data: (1) the radiation detection device 6 or 7; (2) the Container ID 10; (3) the weapon fingerprint database 12; (4) the manifest database 13; (5) the manifest fingerprint database 14 which contains both the Container ID 10 and the standardized Commodity ID 21; and, (6) the inspection day background fingerprint database 15. It should be understood that the inspection day background fingerprint database 15 may contain one or more inspection day background fingerprints. These six sources of data are accessed by the computer 8 running the computer program of the present invention 11. The computer program 11 has access to the six sources of data. The output of the computer 8 is the return of statuses: (1) "likely contains an unshielded nuclear weapon" 16; (2) "likely has the contents said to be in it by the manifest" 17; (3) "likely contains radiation shielding material that could possibly shield a nuclear weapon" 18; (4) "likely contains legitimate contents that are different than those listed on the manifest" 19; and, (5) "contents unknown" 20.

FIG. 4a is detail of the manifest database which contains both the Container ID 10 and the standardized Commodity ID 21. FIG. 4b is detail of the manifest fingerprint database which contains both the Container ID 10 and the standardized Commodity ID 21.

Figure 5:
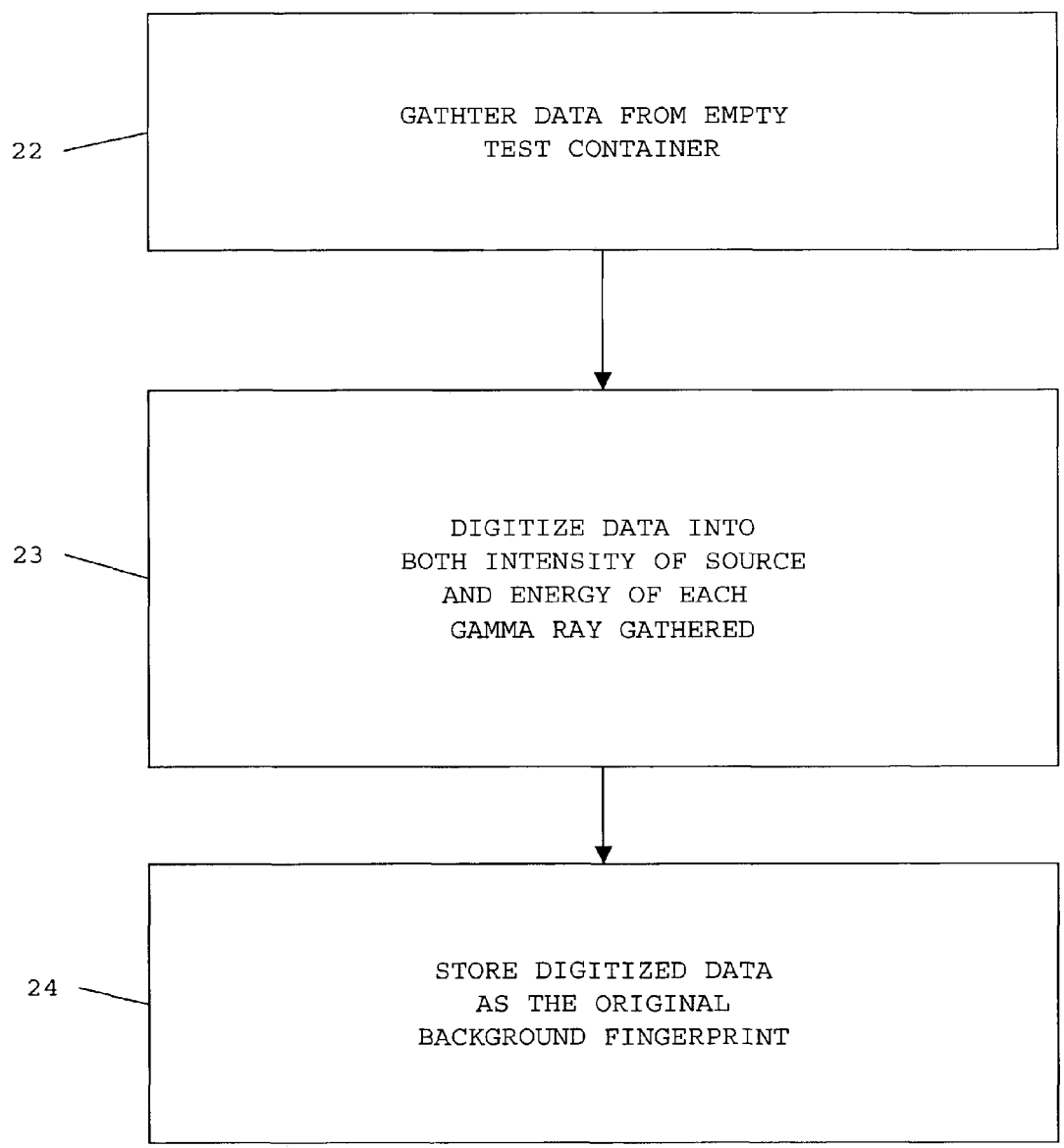
FIG. 5 is a flow chart which illustrates the creation of the original background fingerprint of the present invention.

FIG. 5 is a flow chart which illustrates the creation of the original background fingerprint of the computer program, database structures and methods of the present invention. At step 22, the radiation detection device 6 or 7 takes the fingerprint of an empty test container. At step 23, the data from the radiation detection device 6 or 7 is then digitized into both the intensity of the source of gamma rays and the energy of each gamma ray detected. Alternatively, this data may be digitized into either the intensity of the source of gamma rays or the energy of each gamma ray detected. At step 24, this digitized data is then stored as the original background fingerprint.

Figure 6:
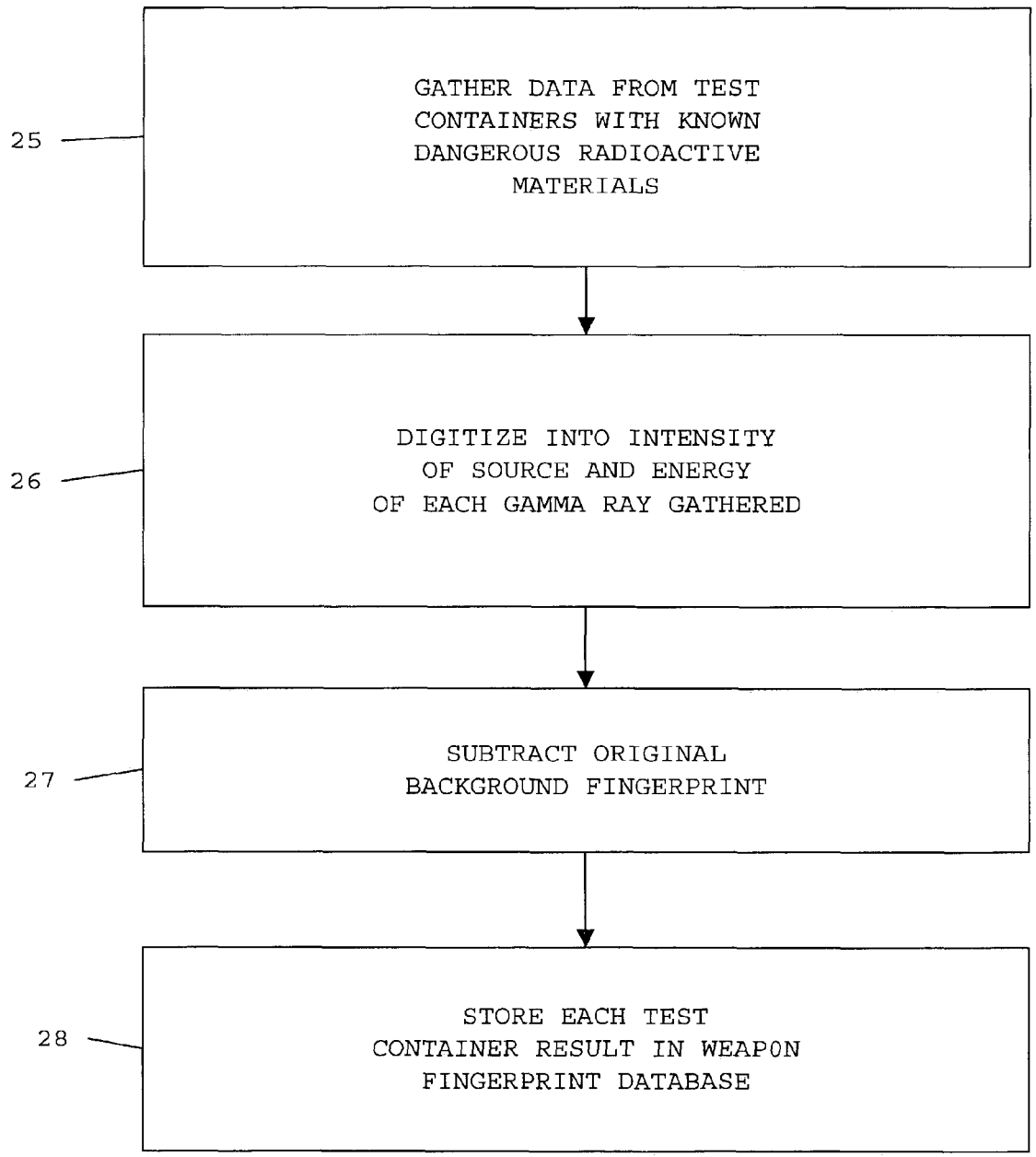
FIG. 6 is a flow chart which illustrates the creation of the weapon-fingerprint database of the present invention.

FIG. 6 is a flow chart which illustrates the creation of the weapon fingerprint database 12 of the computer program, database structures and methods of the present invention. At step 25, the radiation detection device 6 or 7 takes the fingerprint of series of test containers with known, dangerous radioactive materials in them. At step 26, the data from the radiation detection device 6 or 7 for each such known, dangerous radioactive material is then digitized into both the intensity of the source of gamma rays and the energy of each gamma ray detected. Alternatively, this data may be digitized into either the intensity of the source of gamma rays or the energy of each gamma ray detected. At step 27, the original background fingerprint (FIG. 5) is subtracted from this digitized data. At step 28, the resulting data for each such test container with known, dangerous radioactive material in it is stored in the weapon fingerprint database 12.

Figure 7:
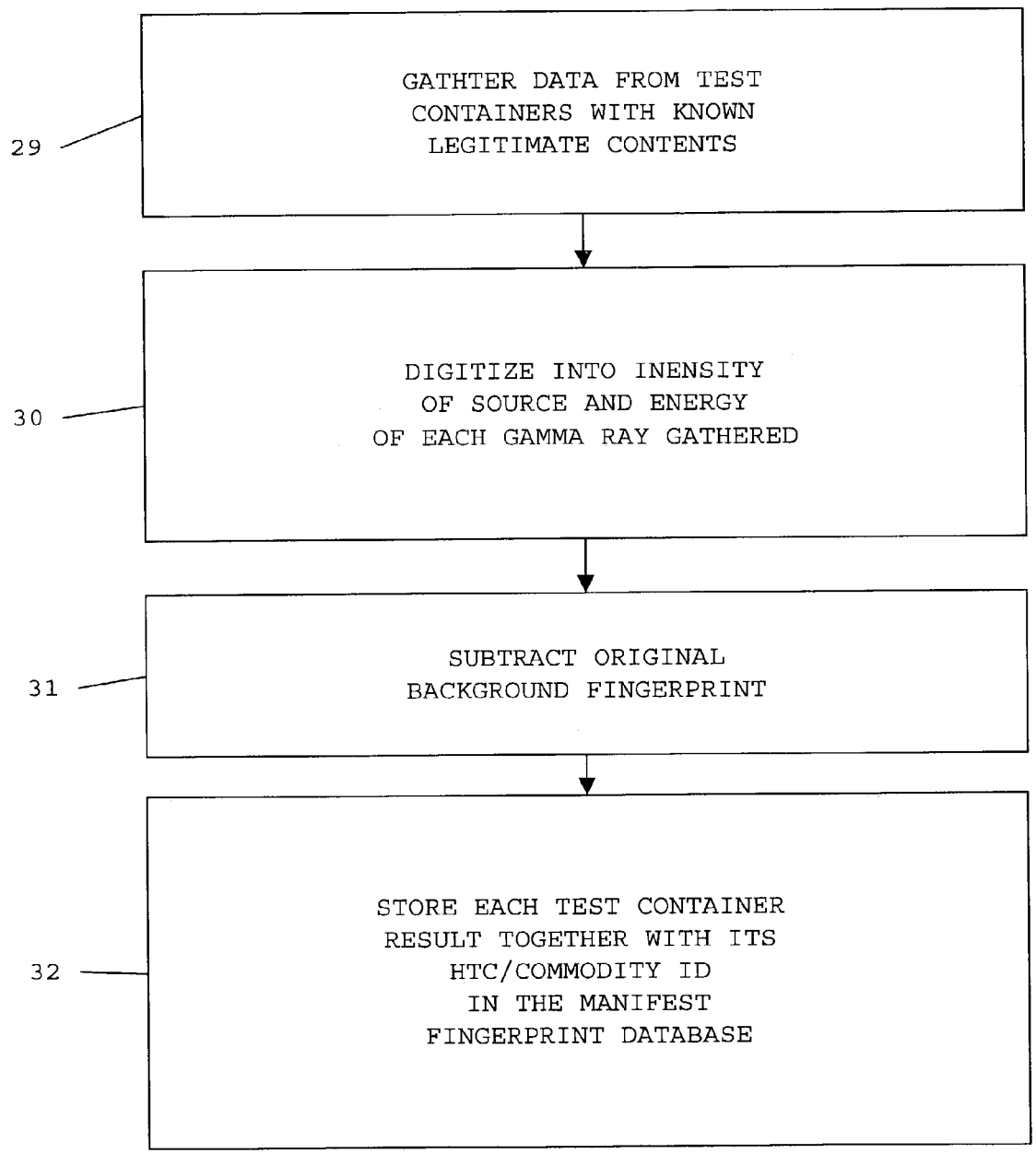
FIG. 7 is a flow chart which illustrates the creation of the manifest fingerprint database of the present invention.

FIG. 7 is a flow chart which illustrates the creation of the manifest fingerprint database 14 of the computer program, database structures and methods of the present invention. At step 29, the radiation detection device 6 or 7 takes the fingerprint of test containers with known, legitimate contents in them. At step 30, the data from the radiation detection device 6 or 7 for each such known, legitimate content is then digitized into both the intensity of the source of gamma rays and the energy of each gamma ray detected. Alternatively, this data may be digitized into either the intensity of the source of gamma rays or the energy of each gamma ray detected. At step 31, the original background fingerprint (FIG. 5) is subtracted from this digitized data. At step 32, the resulting data for each such test container with known, legitimate content in it and its associated standardized Commodity ID are stored in the manifest fingerprint database 14.

Figure 8:
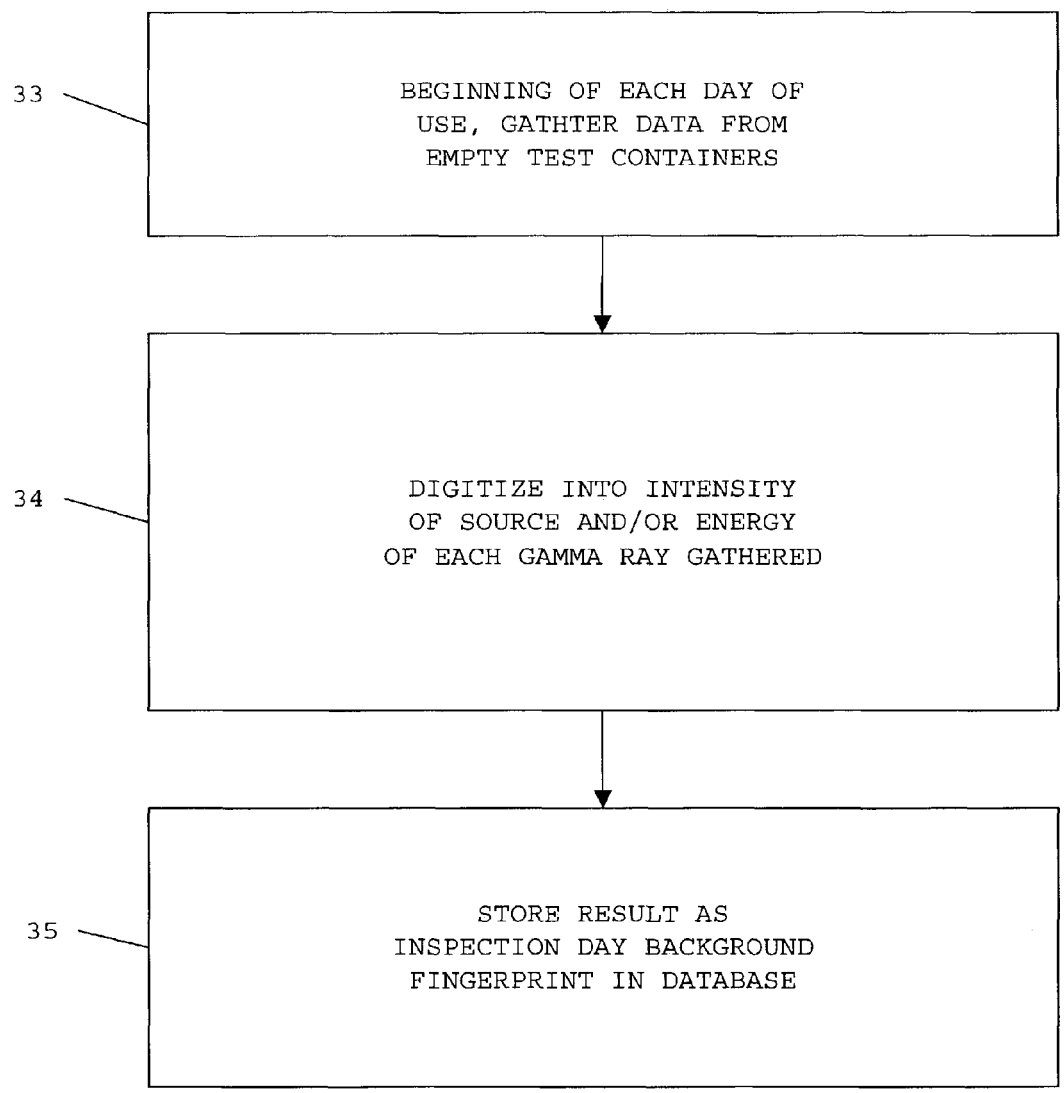
FIG. 8 is a flow chart which illustrates the creation of the inspection day background fingerprint database of the present invention.

FIG. 8 is a flow chart which illustrates the creation of the inspection day background fingerprint database 15 of the computer program, database structures and methods of the present invention. At step 33, at the beginning of each day of use, the radiation detection device 6 or 7 takes the fingerprint of an empty test container. At step 34, the data from the radiation detection device 6 or 7 is then digitized into both the intensity of the source of gamma rays and the energy of each gamma ray detected. Alternatively, this data may be digitized into either the intensity of the source of gamma rays or the energy of each gamma ray detected. At step 35, this digitized data is then stored in the inspection day background fingerprint database 15.

FIG. 9 is a flow chart which illustrates the operation of the computer program, database structures and methods of the present invention. At step 36, the radiation detection device 6 or 7 takes the fingerprint of the suspect container 2. At step 37, the suspect container's fingerprint is normalized by subtracting the inspection day background fingerprint from it. At step 38, the weapon fingerprint database 12 is consulted to compare the suspect container's normalized fingerprint with the fingerprints in the weapon fingerprint database 12. At step 39, it is determined whether the suspect container's normalized fingerprint heuristically matches any of the fingerprints in the weapon fingerprint database 12. If "Yes," then the suspect container likely contains an unshielded nuclear weapon and at step 40, status 16 to that effect is returned.

If "No," then at step 41, the manifest database 13 is consulted to look up the Container ID 10 and extract the standardized Commodity ID 21 for the contents said to be in the suspect container. At step 42, the manifest fingerprint database 14 is consulted to locate the fingerprint associated with this standardized Commodity ID 21. At step 43, it is determined whether the suspect container's normalized fingerprint heuristically matches the fingerprint from the manifest fingerprint database 14 associated with this standardized Commodity ID 21 (the "purported fingerprint"). If "Yes," then the suspect container likely contains the contents said to be in it by the manifest and at step 44, status 17 to that effect is returned.

If "No," then at step 45, the inspection day background fingerprint database 15 is consulted to compare the suspect container's normalized fingerprint with the inspection day background fingerprint. At step 46, it is determined whether the suspect container's normalized fingerprint is substantially lower than the inspection day background fingerprint. If "Yes," then the suspect container likely contains radiation shielding material that could possibly shield a nuclear weapon and at step 47, status 18 to that effect is returned.

It should be understood that at this point in the operation, there has been a determination whether the suspect container contains (1) a nuclear weapon; or, (2) contents as listed on the manifest; or, (3) radiation shielding material. If none of these potential contents have been determined to be in the container, then the process can stop.

To continue the interrogation of the contents, if the suspect container's normalized fingerprint is not substantially lower than the inspection day background fingerprint, then at step 48, the manifest fingerprint database 14 is consulted to compare the suspect container's normalized fingerprint with each fingerprint in the manifest fingerprint database 14. At step 49, it is determined whether the suspect container's normalized fingerprint heuristically matches any fingerprint in the manifest fingerprint database 14. If "Yes," then the suspect container likely contains legitimate contents that are different than those listed on the manifest and at step 50, status 19 to that effect is returned. If "No," then the contents of the suspect container are unknown and at step 51 status 20 to that effect is returned.

The order in which each step is performed many be varied to suit the particular purposes or needs of the operator.

In the ordinary course of business, shipping companies and their agents will advise container shippers of the maximum radiation and radiation shielding material levels permitted to be in a container beyond which it will be automatically be inspected before loading. Vice versa, in the ordinary course of business, legitimate shippers will advise the shipping company or agent that their particular container shipment will exceed these levels and need pre-loading inspection.

There has been described hereinabove a novel method for detecting radiation or radiation shielding material in containers. Those skilled in the art may now make numerous uses of, and departures from, the hereinabove described embodiments without departing from the inventive principles disclosed herein. Accordingly, the present invention is to be defined solely by the lawfully permissible scope of the appended claims.

DEFINITION OF CERTAIN WORDS, TERMS OR PHRASES USED

"Container." As used in this written description, "container" means any kind of a receptacle, such as a box, carton, can, or jar, in which material is held or carried. A "shipping container" is a container that has been standardized for efficient land and ocean-going shipping and handling. In FIGS. 1 and 2, a "shipping container" 2 is shown. "Container" includes, but is not limited to, truck trailers, railcars, airfreight containers, luggage and the like.

"Legitimate content." As used in this written description, "legitimate content" means the contents of a container that may be lawfully transported.

"To digitize." As used in this written description, "to digitize" means to transform analog data into digital form.

"Digitized gamma ray data." As used in this written description, digitized gamma ray data means any measurement or record of gamma rays emitted by matter which has been digitized.

"Energy of each gamma ray." As used in this written description, "energy of each gamma ray" means the energy of the deposit of radiation as the gamma ray stops or is absorbed by matter, in general, and by matter that detects gamma radiation, in particular. For example, as gamma rays pass through a sodium iodide (NaI) detector, their energy is absorbed by the NaI. This energy is "re-radiated" in the visual spectrum which a photomultiplier detects and turns into an electrical signal. For a solid state detector like Cadmium Telluride (CdTe), the gamma ray energy is absorbed by CdTe and then released directly as an electric signal. The electrical signal strength is directly proportional to the energy of the gamma ray.

"To heuristically match." As used in this written description, "to heuristically match" means to compare patterns of digitized data, determine their similarity with a high degree of certainty while not requiring an exact match. A "heuristic match" is the result of heuristically matching.

"Intensity of the source of the gamma ray." As used in this written description, "intensity of the source of the gamma ray(s)" means the number of gamma ray photons emitted by a particular radioactive material per units of time;

"Spectrogram." As used in this written description, "spectrogram" means a graphic or photographic representation of a spectrum. As used in this written description, "spectrograph" and "spectrogram" are synonymous.

"Spectrographically analyze." As used in this written description, "spectrographically analyze" means to analyze data represented as a spectrogram.

"Substantially lower than the inspection day background fingerprint." As used in this written description, "substantially lower than the inspection day background fingerprint" means lower to the extent that one could reasonably conclude that the detection device is gathering shielded background radiation data.

What is claimed is:

1. A computer readable medium containing executable code comprising:
    code that develops a container fingerprint derived from gamma rays detected about a container;
    code that compares said container fingerprint to a predetermined fingerprint corresponding to a known sample of radioactive or fissile material to determine whether said container fingerprint and said predetermined fingerprint heuristically match; and
    code that indicates, in the event said container fingerprint and said predetermined fingerprint heuristically match, that said container contains said known radioactive or fissile material.

2. A computer readable medium as set forth in claim 1 wherein said code that develops includes:
    code that reads raw data obtained from said gamma rays; and
    code that subtracts predetermined background data from said raw data to develop said container fingerprint.

3. A computer readable medium as set forth in claim 2 wherein said raw data and said predetermined background data are raw digitized data and predetermined digitized background data, respectively.

4. A computer readable medium as set forth in claim 3 wherein said predetermined digitized background data is a background fingerprint and said raw digitized data is an unnormalized container fingerprint.

5. A computer readable medium as set forth in claim 3 wherein said raw digital data and said predetermined digital background data are each a selected one of intensity data and energy spectrum data.

6. A computer readable medium as set forth in claim 1 wherein said code that compares further compares said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

7. A computer readable medium as set forth in claim 1 wherein said code that compares further includes code that consults a database containing a plurality of predetermined fingerprints, said predetermined fingerprint being one of said plurality of predetermined fingerprints.

8. A computer readable medium as set forth in claim 1 wherein said code that compares further includes code that compares, in the event said container fingerprint and said predetermined fingerprint fail to match heuristically, said container fingerprint to a purported fingerprint identified from being associated with a standardized commodity ID known from a manifest associated with said container to determine whether said container fingerprint and said purported fingerprint heuristically match, and wherein said code that indicates further indicates, in the event said container fingerprint and said purported fingerprint heuristically match, that said container contains contents identified by said standardized commodity ID.

9. A computer readable medium as set forth in claim 8 wherein said code that compares said container fingerprint to said purported fingerprint further compares said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said code that indicates further indicates that, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

10. A computer readable medium as set forth in claim 8 wherein said code that compares said container fingerprint to said purported fingerprint further includes code that consults a database containing a plurality of purported fingerprints, each of said purported fingerprints being stored in association with a respective one of a plurality of standardized commodity ID's, said purported fingerprint being one of said plurality of purported fingerprints and said standardized commodity ID being one of said plurality of standardized commodity ID's.

11. A computer readable medium as set forth in claim 1 wherein said code that compares further compares, in the event said container fingerprint and said predetermined fingerprint fail to match heuristically, said container fingerprint to a background fingerprint to determine whether said container fingerprint is substantially lower than said background fingerprint, and wherein said code that indicates further indicates, in the event said container fingerprint is substantially lower than said background fingerprint, that said container contains radiation shielding material.

12. A computer readable medium as set forth in claim 11 wherein said code that compares said container fingerprint to said background fingerprint further includes code that consults a database containing said background fingerprint.

13. A computer readable medium as set forth in claim 1 wherein said code that compares further compares, in the event said container fingerprint and said predetermined fingerprint fail to match heuristically, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said code that indicates further indicates, in the event said container fingerprint and said at least one of said purported fingerprints heuristically match, that said container contains contents identified by said respective one of said standardized commodity ID's associated with said at least one of said purported fingerprints.

14. A computer readable medium as set forth in claim 13 wherein said respective one of said standardized commodity ID's that identifies contents of said container is in variance to any such standardized commodity ID listed on a manifest associated with said container.

15. A computer readable medium as set forth in claim 13 wherein said code that indicates further indicates, in the event said container fingerprint and each of said purported fingerprints fail to match, that contents of said container is unknown.

16. A computer readable medium as set forth in claim 13 wherein said code that compares said container fingerprint to each of said plurality of purported fingerprints further includes code that consults a database containing said plurality of purported fingerprints, each of said plurality of purported fingerprints being stored in association with said respective one of said plurality of standardized commodity ID's.

17. A computer readable medium as set forth in claim 1 wherein said gamma rays normally exist about said container in the absence of absorption of thermal neutrons.

18. A computer readable medium containing executable code comprising:
  code that develops a container fingerprint derived from gamma rays detected about a container;
  code that compares said container fingerprint to a purported fingerprint identified from being associated with a standardized commodity ID known from a manifest associated with said container to determine whether said container fingerprint and said purported fingerprint heuristically match; and
  code that indicates, in the event said container fingerprint and said purported fingerprint heuristically match, that said container contains contents identified by said standardized commodity ID.

19. A computer readable medium as set forth in claim 18 wherein said code that develops includes:
  code that reads raw data obtained from said gamma rays; and
  code that subtracts predetermined background data from said raw data to develop said container fingerprint.

20. A computer readable medium as set forth in claim 19 wherein said raw data and said predetermined background data are raw digitized data and predetermined digitized background data, respectively.

21. A computer readable medium as set forth in claim 20 wherein said predetermined digitized background data is a background fingerprint and said raw digitized data is an unnormalized container fingerprint.

22. A computer readable medium as set forth in claim 20 wherein said raw digital data and said predetermined digital background data are each a selected one of intensity data and energy spectrum data.

23. A computer readable medium as set forth in claim 18 wherein said code that compares further compares said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said code that indicates further indicates that, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

24. A computer readable medium as set forth in claim 18 wherein said code that compares further includes code that consults a database containing a plurality of purported fingerprints, each of said purported fingerprints being stored in association with a respective one of a plurality of standardized commodity ID's, said purported fingerprint being one of said plurality of purported fingerprints and said standardized commodity ID being one of said plurality of standardized commodity ID's.

25. A computer readable medium as set forth in claim 18 wherein said code that compares further compares, in the event said container fingerprint and said purported fingerprint fail to match heuristically, to a background fingerprint to determine whether said container fingerprint is substantially lower than said background fingerprint, and wherein said code that indicates further indicates, in the event said container fingerprint is substantially lower than said background fingerprint, that said container contains radiation shielding material.

26. A computer readable medium as set forth in claim 25 wherein said code that compares said container fingerprint to said background fingerprint further includes code that consults a database containing said background fingerprint.

27. A computer readable medium as set forth in claim 18 wherein said code that compares further includes code that compares, in the event said container fingerprint and said purported fingerprint fail to match heuristically, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said code that indicates further indicates, in the event said container fingerprint and said at least one of said purported fingerprints heuristically match, that said container contains contents identified by said respective one of said standardized commodity ID's associated with said at least one of said purported fingerprints.

28. A computer readable medium as set forth in claim 27 wherein said respective one of said standardized commodity ID's that identifies contents of said container is in variance to any such standardized commodity ID listed on a manifest associated with said container.

29. A computer readable medium as set forth in claim 27 wherein said code that indicates further indicates, in the event said container fingerprint and each of said purported fingerprints fail to match, that contents of said container is unknown.

30. A computer readable medium as set forth in claim 27 wherein said code that compares said container fingerprint to each of said plurality of purported fingerprints further includes code that consults a database containing said plurality of purported fingerprints, each of said plurality of purported fingerprints being stored in association with said respective one of said plurality of standardized commodity ID's.

31. A computer readable medium as set forth in claim 18 wherein said code that compares further compares, in the event said container fingerprint and said purported fingerprint fail to match heuristically, said container fingerprint to a predetermined fingerprint of a known sample of radioactive or fissile material to determine whether said container fingerprint and said predetermined fingerprint heuristically match, and wherein said code that indicates further indicates, in the event said container fingerprint and said predetermined fingerprint heuristically match, that said container contains a known radioactive or fissile material.

32. A computer readable medium as set forth in claim 31 wherein said code that compares said container fingerprint to said predetermined fingerprint further compares said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

33. A computer readable medium as set forth in claim 31 wherein said code that compares said container fingerprint to said predetermined fingerprint further includes code that consults a database containing a plurality of predetermined fingerprints, said predetermined fingerprint being one of said plurality of predetermined fingerprints.

34. A computer readable medium as set forth in claim 31 wherein said gamma rays normally exist about said container in the absence of absorption of thermal neutrons.

35. A computer readable medium containing executable code comprising:
   code that develops a container fingerprint derived from gamma rays detected about a container;
   code that compares said container fingerprint to a background fingerprint to determine whether said container fingerprint is substantially lower than said background fingerprint; and
   code that indicates, in the event said container fingerprint is substantially lower than said background fingerprint, that said container contains radiation shielding material.

36. A computer readable medium as set forth in claim 35 wherein said code that develops includes:
   code that reads raw data obtained from said gamma rays; and
   code that subtracts predetermined background data from said raw data to develop said container fingerprint.

37. A computer readable medium as set forth in claim 36 wherein said raw data and said predetermined background data are raw digitized data and predetermined digitized background data, respectively.

38. A computer readable medium as set forth in claim 37 wherein said predetermined digitized background data is a background fingerprint and said raw digitized data is an unnormalized container fingerprint.

39. A computer readable medium as set forth in claim 37 wherein said raw digital data and said predetermined digital background data are each a selected one of intensity data and energy spectrum data.

40. A computer readable medium as set forth in claim 35 wherein said code that compares further includes code that consults a database containing said background fingerprint.

41. A computer readable medium as set forth in claim 35 wherein said code that compares further compares, in the event said container fingerprint is not substantially lower than said background fingerprint, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said code that indicates further indicates, in the event said container fingerprint and said at least one of said purported fingerprints heuristically match, that said container contains contents identified by said respective one of said standardized commodity ID's associated with said at least one of said purported fingerprints.

42. A computer readable medium as set forth in claim 41 wherein said respective one of said standardized commodity ID's that identifies contents of said container is in variance to any such standardized commodity ID listed on a manifest associated with said container.

43. A computer readable medium as set forth in claim 41 wherein said code that indicates further indicates, in the event said container fingerprint and each of said purported fingerprints fail to match, that contents of said container is unknown.

44. A computer readable medium as set forth in claim 41 wherein said code that compares said container fingerprint to each of said plurality of purported fingerprints further includes code that consults a database containing said plurality of purported fingerprints, each of said plurality of purported fingerprints being stored in association with said respective one of said plurality of standardized commodity ID's.

45. A computer readable medium as set forth in claim 35 wherein said code that compares further compares, in the event said container fingerprint is not substantially lower than said background fingerprint, said container fingerprint to a predetermined fingerprint of a known sample of radioactive or fissile material to determine whether said container fingerprint and said predetermined fingerprint heuristically match, and wherein said code that indicates further indicates, in the event said container fingerprint and said predetermined fingerprint heuristically match, that said container contains said known radioactive or fissile material.

46. A computer readable medium as set forth in claim 45 wherein said code that compares said container fingerprint to said predetermined fingerprint further compares said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

47. A computer readable medium as set forth in claim 45 wherein said code that compares said container fingerprint to said predetermined fingerprint further includes code that consults a database containing a plurality of predetermined fingerprints, said predetermined fingerprint being one of said plurality of predetermined fingerprints.

48. A computer readable medium as set forth in claim 36 wherein said code that compares further includes code that compares, in the event said container fingerprint is not substantially lower than said background fingerprint, said container fingerprint to a purported fingerprint identified from being associated with a standardized commodity ID known from a manifest associated with said container to determine whether said container fingerprint and said purported fingerprint heuristically match, and wherein said code that indicates further indicates, in the event said container fingerprint and said purported fingerprint heuristically match, that said container contains contents identified by said standardized commodity ID.

49. A computer readable medium as set forth in claim 48 wherein said code that compares said container fingerprint to said purported fingerprint further compares said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said code that indicates further indicates that, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

50. A computer readable medium as set forth in claim 48 wherein said code that compares said container fingerprint to said purported fingerprint further includes code that consults a database containing a plurality of purported fingerprints, each of said purported fingerprints being stored in association with a respective one of a plurality of standardized commodity ID's, said purported fingerprint being one of said plurality of purported fingerprints and said standardized commodity ID being one of said plurality of standardized commodity ID's.

51. A computer readable medium as set forth in claim 35 wherein said gamma rays normally exist about said container in the absence of absorption of thermal neutrons.

52. A method comprising the steps of:
developing a container fingerprint derived from gamma rays detected about a container;
comparing said container fingerprint to a predetermined fingerprint corresponding to a known sample of radioactive or fissile material to determine whether said container fingerprint and said predetermined fingerprint heuristically match; and
indicating, in the event said container fingerprint and said predetermined fingerprint heuristically match, that said container contains said known radioactive or fissile material.

53. A method as set forth in claim 52 wherein said developing step includes the steps of:
reading raw data obtained from said gamma rays; and
subtracting predetermined background data from said raw data to develop said container fingerprint.

54. A method as set forth in claim 53 wherein said raw data and said predetermined background data are raw digitized data and predetermined digitized background data, respectively.

55. A method as set forth in claim 54 wherein said predetermined digitized background data is a background fingerprint and said raw digitized data is an unnormalized container fingerprint.

56. A method as set forth in claim 54 wherein said raw digital data and said predetermined digital background data are each a selected one of intensity data and energy spectrum data.

57. A method as set forth in claim 52 wherein said comparing step further includes the step of comparing said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

58. A method as set forth in claim 52 wherein said comparing step further includes the step of consulting a database containing a plurality of predetermined fingerprints, said predetermined fingerprint being one of said plurality of predetermined fingerprints.

59. A method as set forth in claim 52 wherein said comparing step further includes the step of comparing, in the event said container fingerprint and said predetermined fingerprint fail to match heuristically, said container fingerprint to a purported fingerprint identified from being associated with a standardized commodity ID known from a manifest associated with said container to determine whether said container fingerprint and said purported fingerprint heuristically match, and wherein said indicating step further includes the step of indicating, in the event said container fingerprint and said purported fingerprint heuristically match, that said container contains contents identified by said standardized commodity ID.

60. A method as set forth in claim 59 wherein said comparing said container fingerprint to said purported fingerprint step further includes the step of comparing said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said indicating step further includes the step of indicating, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

61. A method as set forth in claim 59 wherein said comparing said container fingerprint to said purported fingerprint step further includes the step of consulting a database containing a plurality of purported fingerprints, each of said purported fingerprints being stored in association with a respective one of a plurality of standardized commodity ID's, said purported fingerprint being one of said plurality of purported fingerprints and said standardized commodity ID being one of said plurality of standardized commodity ID's.

62. A method as set forth in claim 52 wherein said comparing step further includes the step of comparing, in the event said container fingerprint and said predetermined fingerprint fail to match heuristically, said container fingerprint to a background fingerprint to determine whether said container fingerprint is substantially lower than said background fingerprint, and wherein said indicating step further includes the step of indicating, in the event said container fingerprint is substantially lower than said background fingerprint, that said container contains radiation shielding material.

63. A method as set forth in claim 62 wherein said comparing said container fingerprint to said background fingerprint step further includes the step of consulting a database containing said background fingerprint.

64. A method as set forth in claim 52 wherein said comparing step further includes the step of comparing, in the event said container fingerprint and said predetermined fingerprint fail to match heuristically, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said indicating step further includes the step of indicating, in the event said container fingerprint and said at least one of said purported fingerprints heuristically match, that said container contains contents identified by said respective one of said standardized commodity ID's associated with said at least one of said purported fingerprints.

65. A method as set forth in claim 64 wherein said respective one of said standardized commodity ID's that identifies contents of said container is in variance to any such standardized commodity ID listed on a manifest associated with said container.

66. A method as set forth in claim 64 wherein said indicating step further includes the step of indicating, in the event said container fingerprint and each of said purported fingerprints fail to match, that contents of said container is unknown.

67. A method as set forth in claim 64 wherein said comparing said container fingerprint to each of said plurality of purported fingerprints step further includes the step of consulting a database containing said plurality of purported fingerprints, each of said plurality of purported fingerprints being stored in association with said respective one of said plurality of standardized commodity ID's.

68. A method as set forth in claim 52 wherein said gamma rays normally exist about said container in the absence of absorption of thermal neutrons.

69. A method comprising the steps of:
developing a container fingerprint derived from gamma rays detected about a container;
comparing said container fingerprint to a purported fingerprint identified from being associated with a standardized commodity ID known from a manifest associated with said container to determine whether said container fingerprint and said purported fingerprint heuristically match; and
indicating, in the event said container fingerprint and said purported fingerprint heuristically match, that said container contains contents identified by said standardized commodity ID.

70. A method as set forth in claim 66 wherein said developing step includes the steps of:
reading raw data obtained from said gamma rays; and
subtracting predetermined background data from said raw data to develop said container fingerprint.

71. A method as set forth in claim 70 wherein said raw data and said predetermined background data are raw digitized data and predetermined digitized background data, respectively.

72. A method as set forth in claim 71 wherein said predetermined digitized background data is a background fingerprint and said raw digitized data is an unnormalized container fingerprint.

73. A method as set forth in claim 69 wherein said raw digital data and said predetermined digital background data are each a selected one of intensity data and energy spectrum data.

74. A method as set forth in claim 69 wherein said comparing step further includes the step of comparing said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said indicating step further includes the step of indicating that, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

75. A method as set forth in claim 69 wherein said comparing step further includes the step of consulting a database containing a plurality of purported fingerprints, each of said purported fingerprints being stored in association with a respective one of a plurality of standardized commodity ID's, said purported fingerprint being one of said plurality of purported fingerprints and said standardized commodity ID being one of said plurality of standardized commodity ID's.

76. A method as set forth in claim 69 wherein said comparing step further includes the step of comparing, in the event said container fingerprint and said purported fingerprint fail to match heuristically, to a background fingerprint to determine whether said container fingerprint is substantially lower than said background fingerprint, and wherein said indicating step further includes the step of indicating, in the event said container fingerprint is substantially lower than said background fingerprint, that said container contains radiation shielding material.

77. A method as set forth in claim 76 wherein said comparing said container fingerprint to said background fingerprint step further includes the step of consulting a database containing said background fingerprint.

78. A method as set forth in claim 69 wherein said comparing step further includes the step of comparing, in the event said container fingerprint and said purported fingerprint fail to match heuristically, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said indicating step further includes the step of indicating, in the event said container fingerprint and said at least one of said purported fingerprints heuristically match, that said container contains contents identified by said respective one of said standardized commodity ID's associated with said at least one of said purported fingerprints.

79. A method as set forth in claim 78 wherein said respective one of said standardized commodity ID's that identifies contents of said container is in variance to any such standardized commodity ID listed on a manifest associated with said container.

80. A method as set forth in claim 78 wherein said indicating step further includes the step of indicating, in the event said container fingerprint and each of said purported fingerprints fail to match, that contents of said container is unknown.

81. A method as set forth in claim 78 wherein said comparing said container fingerprint to each of said plurality of purported fingerprints step further includes the step of consulting a database containing said plurality of purported fingerprints, each of said plurality of purported fingerprints being stored in association with said respective one of said plurality of standardized commodity ID's.

82. A method as set forth in claim 69 wherein said comparing step further includes the step of comparing, in the event said container fingerprint and said purported fingerprint fail to match heuristically, said container fingerprint to a predetermined fingerprint of a known sample of radioactive or fissile material to determine whether said container fingerprint and said predetermined fingerprint heuristically match, and wherein said indicating step further includes the step of indicating, in the event said container fingerprint and said predetermined fingerprint heuristically match, that said container contains a known radioactive or fissile material.

83. A method as set forth in claim 82 wherein said comparing said container fingerprint to said predetermined fingerprint step further includes the step of comparing said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

84. A method as set forth in claim 82 wherein said comparing said container fingerprint to said predetermined fingerprint step further includes the step of consulting a database containing a plurality of predetermined fingerprints, said predetermined fingerprint being one of said plurality of predetermined fingerprints.

85. A method as set forth in claim 82 wherein said gamma rays normally exist about said container in the absence of absorption of thermal neutrons.

86. A method comprising the steps of:
developing a container fingerprint derived from gamma rays detected about a container;
comparing said container fingerprint to a background fingerprint to determine whether said container fingerprint is substantially lower than said background fingerprint; and
indicating, in the event said container fingerprint is substantially lower than said background fingerprint, that said container contains radiation shielding material.

87. A method as set forth in claim 86 wherein said developing step includes the steps of:
reading raw data obtained from said gamma rays; and
subtracting predetermined background data from said raw data to develop said container fingerprint.

88. A method as set forth in claim 87 wherein said raw data and said predetermined background data are raw digitized data and predetermined digitized background data, respectively.

89. A method as set forth in claim 88 wherein said predetermined digitized background data is a background fingerprint and said raw digitized data is an unnormalized container fingerprint.

90. A method as set forth in claim 88 wherein said raw digital data and said predetermined digital background data are each a selected one of intensity data and energy spectrum data.

91. A method as set forth in claim 86 wherein said comparing step further includes the step of consulting a database containing said background fingerprint.

92. A method as set forth in claim 86 wherein said comparing step further includes the step of comparing, in the event said container fingerprint is not substantially lower than said background fingerprint, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said indicating step further includes the step of indicating, in the event said container fingerprint and said at least one of said purported fingerprints heuristically match, that said container contains contents identified by said respective one of said standardized commodity ID's associated with said at least one of said purported fingerprints.

93. A method as set forth in claim 92 wherein said respective one of said standardized commodity ID's that identifies contents of said container is in variance to any such standardized commodity ID listed on a manifest associated with said container.

94. A method as set forth in claim 92 wherein said indicating step further includes the step of indicating, in the event said container fingerprint and each of said purported fingerprints fail to match, that contents of said container is unknown.

95. A method as set forth in claim 92 wherein said comparing said container fingerprint to each of said plurality of purported fingerprints step further includes the step of consulting a database containing said plurality of purported fingerprints, each of said plurality of purported fingerprints being stored in association with said respective one of said plurality of standardized commodity ID's.

96. A method as set forth in claim 86 wherein said comparing step further includes the step of comparing, in the event said container fingerprint is not substantially lower than said background fingerprint, said container fingerprint to a predetermined fingerprint of a known sample of radioactive or fissile material to determine whether said container fingerprint and said predetermined fingerprint heuristically match, and wherein said indicating step further includes the step of indicating, in the event said container fingerprint and said predetermined fingerprint heuristically match, that said container contains said known radioactive or fissile material.

97. A method as set forth in claim 96 wherein said comparing said container fingerprint to said predetermined fingerprint step further includes the step of comparing said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

98. A method as set forth in claim 96 wherein said comparing said container fingerprint to said predetermined fingerprint step further includes the step of consulting a database containing a plurality of predetermined fingerprints, said predetermined fingerprint being one of said plurality of predetermined fingerprints.

99. A method as set forth in claim 86 wherein said comparing step further includes the step of comparing, in the event said container fingerprint is not substantially lower than said background fingerprint, said container fingerprint to a purported fingerprint identified from being associated with a standardized commodity ID known from a manifest associated with said container to determine whether said container fingerprint and said purported fingerprint heuristically match, and wherein said indicating step further includes the step of indicating, in the event said container fingerprint and said purported fingerprint heuristically match, that said container contains contents identified by said standardized commodity ID.

100. A method as set forth in claim 99 wherein said comparing said container fingerprint to said purported fingerprint step further includes the step of comparing said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said indicating step further includes the step of indicating, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

101. A method as set forth in claim 99 wherein said comparing said container fingerprint to said purported fingerprint further includes the step of consulting a database containing a plurality of purported fingerprints, each of said purported fingerprints being stored in association with a respective one of a plurality of standardized commodity ID's, said purported fingerprint being one of said plurality of purported fingerprints and said standardized commodity ID being one of said plurality of standardized commodity ID's.

102. A method as set forth in claim 86 wherein said gamma rays normally exist about said container in the absence of absorption of thermal neutrons.

103. An apparatus comprising:
a container fingerprint derived from gamma rays detected about a container; and
a computer operative to compare said container fingerprint to a predetermined fingerprint corresponding to a known sample of radioactive or fissile material to determine whether said container fingerprint and said predetermined fingerprint heuristically match; and further operative to indicate, in the event said container fingerprint and said predetermined fingerprint heuristically match, that said container contains said known radioactive or fissile material.

104. An apparatus as set forth in claim 103 wherein said computer is further operative to read raw data obtained from detecting said gamma rays, and further operative to subtract predetermined background data from said raw data to develop said container fingerprint.

105. An apparatus as set forth in claim 104 wherein said raw data and said predetermined background data are raw digitized data and predetermined digitized background data, respectively.

106. An apparatus as set forth in claim 105 wherein said predetermined digitized background data is a background fingerprint and said raw digitized data is an unnormalized container fingerprint.

107. An apparatus as set forth in claim 105 wherein said raw digital data and said predetermined digital background data are each a selected one of intensity data and energy spectrum data.

108. An apparatus as set forth in claim 103 wherein said computer is further operative to compare said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

109. An apparatus as set forth in claim 103 further comprising a database containing a plurality of predetermined fingerprints, said computer when operative to compare said container fingerprint to said predetermined fingerprint being further operative to consult said database, said predetermined fingerprint being one of said plurality of predetermined fingerprints.

110. An apparatus as set forth in claim 103 wherein said computer is further operative to compare, in the event said container fingerprint and said predetermined fingerprint fail to match heuristically, said container fingerprint to a purported fingerprint identified from being associated with a standardized commodity ID known from a manifest associated with said container to determine whether said container fingerprint and said purported fingerprint heuristically match, and wherein said computer is further operative to indicate, in the event said container fingerprint and said purported fingerprint heuristically match, that said container contains contents identified by said standardized commodity ID.

111. An apparatus as set forth in claim 110 wherein said computer when operative to compare said container fingerprint to said purported fingerprint is further operative to compare said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said computer is further operative to indicate that, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

112. An apparatus as set forth in claim 110 further comprising a database containing a plurality of purported fingerprints, each of said purported fingerprints being stored in association with a respective one of a plurality of standardized commodity ID's, said computer when operative to compare said container fingerprint to said purported fingerprint is further operative to consult said database, said purported fingerprint being one of said plurality of purported fingerprints and said standardized commodity ID being one of said plurality of standardized commodity ID's.

113. An apparatus as set forth in claim 103 wherein said computer is further operative to compare, in the event said container fingerprint and said predetermined fingerprint fail to match heuristically, said container fingerprint to a background fingerprint to determine whether said container fingerprint is substantially lower than said background fingerprint, and wherein said computer is further operative to indicate, in the event said container fingerprint is substantially lower than said background fingerprint, that said container contains radiation shielding material.

114. An apparatus as set forth in claim 113 further comprising a database containing said background fingerprint, said computer when operative to compare said container fingerprint to said background fingerprint being further operative to consult said database.

115. An apparatus as set forth in claim 113 wherein said computer is further operative to compare, in the event said container fingerprint and said predetermined fingerprint fail to match heuristically, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said computer is further operative to indicate, in the event said container fingerprint and said at least one of said purported fingerprints heuristically match, that said container contains contents identified by said respective one of said standardized commodity ID's associated with said at least one of said purported fingerprints.

116. An apparatus as set forth in claim 115 wherein said respective one of said standardized commodity ID's that identifies contents of said container is in variance to any such standardized commodity ID listed on a manifest associated with said container.

117. An apparatus as set forth in claim 115 wherein said computer is further operative to indicate, in the event said container fingerprint and each of said purported fingerprints fail to match, that contents of said container is unknown.

118. An apparatus as set forth in claim 115 further comprising a database containing said plurality of purported fingerprints, each of said plurality of purported fingerprints being stored in association with said respective one of said plurality of standardized commodity ID's, wherein said computer when operative to compare said container fingerprint to each of said plurality of purported fingerprints being further operative to consult said database.

119. An apparatus as set forth in claim 103 wherein said gamma rays normally exist about said container in the absence of absorption of thermal neutrons.

120. An apparatus comprising:
 a container fingerprint derived from gamma rays detected about a container;
 a computer operative to compare said container fingerprint to a purported fingerprint identified from being associated with a standardized commodity ID known from a manifest associated with said container to determine whether said container fingerprint and said purported fingerprint heuristically match, and further operative to indicate, in the event said container fingerprint and said purported fingerprint heuristically match, that said container contains contents identified by said standardized commodity ID.

121. An apparatus as set forth in claim 120 wherein said computer is further operative to read raw data obtained from said gamma rays and further operative to subtract predetermined background data from said raw data to develop said container fingerprint.

122. An apparatus as set forth in claim 121 wherein said raw data and said predetermined background data are raw digitized data and predetermined digitized background data, respectively.

123. An apparatus as set forth in claim 122 wherein said predetermined digitized background data is a background fingerprint and said raw digitized data is an unnormalized container fingerprint.

124. An apparatus as set forth in claim 122 wherein said raw digital data and said predetermined digital background data are each a selected one of intensity data and energy spectrum data.

125. An apparatus as set forth in claim 120 wherein said computer is further operative to compare said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said computer is further operative to indicate, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

126. An apparatus as set forth in claim 120 further comprising a database containing a plurality of purported fingerprints, each of said purported fingerprints being stored in association with a respective one of a plurality of standardized commodity ID's, said computer when operative to compare said container fingerprint to said purported fingerprint is further operative to consult said database, said purported fingerprint being one of said plurality of purported fingerprints and said standardized commodity ID being one of said plurality of standardized commodity ID's.

127. An apparatus as set forth in claim 120 wherein said computer is further operative to compare, in the event said container fingerprint and said purported fingerprint fail to match heuristically, to a background fingerprint to determine whether said container fingerprint is substantially lower than said background fingerprint, and wherein said computer is further operative to indicate, in the event said container fingerprint is substantially lower than said background fingerprint, that said container contains radiation shielding material.

128. An apparatus as set forth in claim 127 further comprising a database containing said background fingerprint, said computer when operative to compare said container fingerprint to said background fingerprint being further operative to consult said database.

129. An apparatus as set forth in claim 120 wherein said computer is further operative to compare, in the event said container fingerprint and said purported fingerprint fail to match heuristically, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said computer is further operative to indicate, in the event said container fingerprint and said at least one of said purported fingerprints heuristically match, that said container contains contents identified by said respective one of said standardized commodity ID's associated with said at least one of said purported fingerprints.

130. An apparatus as set forth in claim 129 wherein said respective one of said standardized commodity ID's that identifies contents of said container is in variance to any such standardized commodity ID listed on a manifest associated with said container.

131. An apparatus as set forth in claim 129 wherein said computer is further operative to indicate, in the event said container fingerprint and each of said purported fingerprints fail to match, that contents of said container is unknown.

132. An apparatus as set forth in claim 129 further comprising a database containing said plurality of purported fingerprints, each of said plurality of purported fingerprints being stored in association with said respective one of said plurality of standardized commodity ID's, wherein said computer when operative to compare said container fingerprint to each of said plurality of purported fingerprints being further operative to consult said database.

133. An apparatus as set forth in claim 120 wherein said computer is further operative to compare, in the event said container fingerprint and said purported fingerprint fail to match heuristically, said container fingerprint to a predetermined fingerprint of a known sample of radioactive or fissile material to determine whether said container fingerprint and said predetermined fingerprint heuristically match, and wherein said computer is further operative to indicate, in the event said container fingerprint and said predetermined fingerprint heuristically match, that said container contains a known radioactive or fissile material.

134. An apparatus as set forth in claim 133 wherein said computer when operative to compare said container fingerprint to said predetermined fingerprint is further operative to compare said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

135. An apparatus as set forth in claim 133 further comprising a database containing a plurality of predetermined fingerprints, said computer when operative to compare said container fingerprint to said predetermined fingerprint being further operative to consult said database, said predetermined fingerprint being one of said plurality of predetermined fingerprints.

136. An apparatus as set forth in claim 133 wherein said gamma rays normally exist about said container in the absence of absorption of thermal neutrons.

137. An apparatus comprising:
a container fingerprint derived from gamma rays detected about a container;
a computer operative to compare said container fingerprint to a background fingerprint to determine whether said container fingerprint is substantially lower than said background fingerprint, and further operative to indicate, in the event said container fingerprint is substantially lower than said background fingerprint, that said container contains radiation shielding material.

138. An apparatus as set forth in claim 137 wherein said computer is operative to read raw data obtained from said gamma rays, and further operative to subtract predetermined background data from said raw data to develop said container fingerprint.

139. An apparatus as set forth in claim 138 wherein said raw data and said predetermined background data are raw digitized data and predetermined digitized background data, respectively.

140. An apparatus as set forth in claim 139 wherein said predetermined digitized background data is a background fingerprint and said raw digitized data is an unnormalized container fingerprint.

141. An apparatus as set forth in claim 139 wherein said raw digital data and said predetermined digital background data are each a selected one of intensity data and energy spectrum data.

142. An apparatus as set forth in claim 137 further comprising a database containing said background fingerprint, said computer when operative to compare said container fingerprint to said background fingerprint being further operative to consult said database.

143. An apparatus as set forth in claim 137 wherein said computer is further operative to compare, in the event said container fingerprint is not substantially lower than said background fingerprint, said container fingerprint to each of a plurality of purported fingerprints to determine whether said container fingerprint and at least one of said purported fingerprints heuristically match, each of said purported fingerprints being associated with a respective one of a plurality of standardized commodity ID's, and wherein said computer is further operative to indicate, in the event said container fingerprint and said at least one of said purported fingerprints heuristically match, that said container contains contents identified by said respective one of said standardized commodity ID's associated with said at least one of said purported fingerprints.

144. An apparatus as set forth in claim 143 wherein said respective one of said standardized commodity ID's that identifies contents of said container is in variance to any such standardized commodity ID listed on a manifest associated with said container.

145. An apparatus as set forth in claim 143 wherein said computer is further operative to indicate, in the event said container fingerprint and each of said purported fingerprints fail to match, that contents of said container is unknown.

146. An apparatus as set forth in claim 143 further comprising a database containing said plurality of purported fingerprints, each of said plurality of purported fingerprints being stored in association with said respective one of said plurality of standardized commodity ID's, wherein said computer when operative to compare said container fingerprint to each of said plurality of purported fingerprints being further operative to consult said database.

147. An apparatus as set forth in claim 137 wherein said computer is further operative to compare, in the event said container fingerprint is not substantially lower than said background fingerprint, said container fingerprint to a predetermined fingerprint of a known sample of radioactive or fissile material to determine whether said container fingerprint and said predetermined fingerprint heuristically match, and wherein said computer is further operative to indicate, in the event said container fingerprint and said predetermined fingerprint heuristically match, that said container contains said known radioactive or fissile material.

148. An apparatus as set forth in claim 147 wherein said computer when operative to compare said container fingerprint to said predetermined fingerprint is further operative to compare said container fingerprint to each of a plurality of predetermined fingerprints, each of said predetermined fingerprints corresponding to a respective one of known samples of radioactive or fissile material, said predetermined fingerprint being one of said plurality of predetermined fingerprints.

149. An apparatus as set forth in claim 147 further comprising a database containing a plurality of predetermined fingerprints, said computer when operative to compare said container fingerprint to said predetermined fingerprint being further operative to consult said database, said predetermined fingerprint being one of said plurality of predetermined fingerprints.

150. An apparatus as set forth in claim 137 wherein said computer is further operative to compare, in the event said container fingerprint is not substantially lower than said background fingerprint, said container fingerprint to a purported fingerprint identified from being associated with a standardized commodity ID known from a manifest associated with said container to determine whether said container fingerprint and said purported fingerprint heuristically match, and wherein said computer is further operative to indicate, in the event said container fingerprint and said purported fingerprint heuristically match, that said container contains contents identified by said standardized commodity ID.

151. An apparatus as set forth in claim 150 wherein said computer when operative to compare said container fingerprint to said purported fingerprint is further operative to compare said container fingerprint to a composite purported fingerprint derived from a plurality of selected purported fingerprints identified from being associated with a respective one of a plurality of standardized commodity ID's known from said manifest to determine whether said container fingerprint and said composite fingerprint heuristically match, and wherein said computer is further operative to indicate, in the event said container fingerprint and said composite fingerprint heuristically match, that said container contains contents identified by said standardized commodity ID's, said purported fingerprint being one of said plurality of purported fingerprints and said standardized commodity ID being one of said plurality of standardized commodity ID's.

152. An apparatus as set forth in claim 150 further comprising a database containing a plurality of purported fingerprints, each of said purported fingerprints being stored in association with a respective one of a plurality of standardized commodity ID's, said computer when operative to compare said container fingerprint to said purported fingerprint is further operative to consult said database, said purported fingerprint being one of said plurality of purported fingerprints and said standardized commodity ID being one of said plurality of standardized commodity ID's.

153. An apparatus as set forth in claim 137 wherein said gamma rays normally exist about said container in the absence of absorption of thermal neutrons.

* * * * *